US008412254B2

(12) United States Patent
Roberts, Sr. et al.

(10) Patent No.: US 8,412,254 B2
(45) Date of Patent: Apr. 2, 2013

(54) INTELLIGENT WIRELESS DISPATCH SYSTEMS

(75) Inventors: Ralph L. Roberts, Sr., Reddick, FL (US); Chris Deck, Wilmington, OH (US); David Mark Vance, Wilmington, OH (US); Brian Earley, Wilmington, OH (US); Steve Crandall, New Vienna, OH (US)

(73) Assignee: R&L Carriers, Inc., Wilmington, OH (US)

( * ) Notice: Subject to any disclaimer, the term of this patent is extended or adjusted under 35 U.S.C. 154(b) by 414 days.

(21) Appl. No.: 12/792,257

(22) Filed: Jun. 2, 2010

(65) Prior Publication Data

US 2011/0300894 A1    Dec. 8, 2011

(51) Int. Cl.
 H04B 7/00 (2006.01)
 H04Q 7/20 (2006.01)
(52) U.S. Cl. .................. 455/521; 455/569.2; 455/566; 455/551
(58) Field of Classification Search .......... 455/521, 455/517, 520, 67.11, 550.1, 566, 569.2, 551, 455/555, 557, 41.2, 3.01; 370/352; 705/1, 705/36; 340/431, 571.1
See application file for complete search history.

(56) References Cited

U.S. PATENT DOCUMENTS

| | | | |
|---|---|---|---|
| 4,212,069 A | 7/1980 | Baumann | |
| 5,068,656 A | 11/1991 | Sutherland | |
| 5,122,959 A | 6/1992 | Nathanson et al. | |
| 5,274,837 A | 12/1993 | Childress et al. | |
| 5,287,551 A | 2/1994 | Gustafson, Jr. et al. | |
| 5,880,958 A | 3/1999 | Helms et al. | |
| 5,922,040 A | 7/1999 | Prabhakaran | |
| 6,026,345 A | 2/2000 | Shah et al. | |
| 6,212,393 B1 | 4/2001 | Suarez et al. | |
| 6,331,825 B1 | 12/2001 | Ladner et al. | |
| 6,339,745 B1 | 1/2002 | Novik | |
| 6,496,775 B2 | 12/2002 | McDonald, Jr. et al. | |
| 6,611,755 B1 | 8/2003 | Coffee et al. | |
| 6,756,913 B1 | 6/2004 | Ayed | |
| 6,873,854 B2 | 3/2005 | Crockett et al. | |
| 6,885,874 B2 | 4/2005 | Grube et al. | |
| 6,892,116 B2 | 5/2005 | Geisler et al. | |
| 6,892,131 B2 | 5/2005 | Coffee et al. | |
| 6,898,436 B2 | 5/2005 | Crockett et al. | |
| 7,246,009 B2 | 7/2007 | Hamblen et al. | |
| 7,343,243 B2 | 3/2008 | Smith et al. | |
| 7,353,036 B2 | 4/2008 | Lemke et al. | |
| 7,385,499 B2 | 6/2008 | Horton et al. | |
| 7,457,693 B2 | 11/2008 | Olsen et al. | |
| 7,551,724 B2 | 6/2009 | Beamon | |
| 7,567,811 B2 | 7/2009 | Simpson et al. | |

(Continued)

Primary Examiner — John J Lee
(74) Attorney, Agent, or Firm — Dinsmore & Shohl LLP

(57) ABSTRACT

Intelligent wireless dispatch systems are provided. In one embodiment, the system includes a dispatch computer and mobile data terminals positioned on a vehicle and in wireless communication with the dispatch computer. The system displays a plurality of drivers arranged in a driver stack, receives exception information from each mobile data terminal, displays a formatted driver icon corresponding to each driver in the driver stack, and sorts the drivers in the driver stack by prioritized exception information. The system is configured to display a driver assignment list for each driver including one or more assignments and to wirelessly transmit an assignment message to the mobile data terminals according to an update to a driver assignment list. The mobile data terminals are configured to display the assignment message for acceptance or rejection. Additional embodiments may also include voice-over-IP capability for two-way communication between the dispatcher and driver.

54 Claims, 16 Drawing Sheets

U.S. PATENT DOCUMENTS

| | | | |
|---|---|---|---|
| 7,624,024 B2 * | 11/2009 | Levis et al. | 705/1.1 |
| 2002/0087548 A1 | 7/2002 | Tasalloti | |
| 2003/0235282 A1 | 12/2003 | Sichelman et al. | |
| 2006/0200550 A1 | 9/2006 | Nelson et al. | |
| 2006/0293024 A1 | 12/2006 | Benco et al. | |
| 2007/0037596 A1 | 2/2007 | Shaffer et al. | |
| 2007/0049314 A1 | 3/2007 | Balachandran et al. | |
| 2007/0202907 A1 | 8/2007 | Shaffer et al. | |
| 2007/0202908 A1 | 8/2007 | Shaffer et al. | |
| 2007/0260375 A1 | 11/2007 | Hilton | |
| 2007/0270172 A1 | 11/2007 | Kalley et al. | |
| 2007/0281723 A1 | 12/2007 | Chotai et al. | |
| 2008/0102869 A1 | 5/2008 | Shaffer et al. | |
| 2008/0147685 A1 * | 6/2008 | Mock et al. | 707/100 |
| 2008/0160952 A1 | 7/2008 | Bull et al. | |
| 2008/0160953 A1 | 7/2008 | Mia et al. | |
| 2008/0175356 A1 | 7/2008 | Seidberg et al. | |
| 2008/0247517 A1 | 10/2008 | Huey | |
| 2009/0004997 A1 | 1/2009 | Allen et al. | |
| 2009/0037194 A1 | 2/2009 | Roche | |
| 2009/0048890 A1 | 2/2009 | Burgh | |
| 2009/0163171 A1 | 6/2009 | Sporel et al. | |

* cited by examiner

| ENUM | STATUS | LOGIN | TASK DISPATCH STATUS | GPS | STOP STATUS |
|---|---|---|---|---|---|
| 0 GRAY | DRIVER NOT LOGGED IN | N | N/A | N/A | N/A |
| 1 GREEN | LOGGED IN DISPATCH OK NO GPS CAPABILITY | Y | OK | NO GPS CAPABILITY | N/A (REQUIRES GPS) |
| 1 GREEN | LOGGED IN DISPATCH OK GPS OK NOT STOPPED | Y | OK | GPS < 30 MINUTES | MOVING OR STOP IN PROGRESS < 30 MINUTES |
| 2 YELLOW | LOGGED IN DISPATCH OK GPS OK STOPPED | Y | OK | GPS < 30 MINUTES | STOP IN PROGRESS > 30 MINUTES |
| 2 YELLOW | LOGGED IN DISPATCH OK NO GPS | Y | OK | GPS > 30 MINUTES | UNKNOWN (REQUIRES GPS) |
| 3 RED | LOGGED IN DISPATCH EXCEPTION NO GPS CAPABILITY | Y | EXCEPTION | NO GPS CAPABILITY | N/A (REQUIRES GPS) |
| 3 RED | LOGGED IN DISPATCH EXCEPTION GPS OK NOT STOPPED | Y | EXCEPTION | GPS < 30 MINUTES | MOVING OR STOP IN PROGRESS < 30 MINUTES |
| 3 RED | LOGGED IN DISPATCH EXCEPTION GPS OK STOPPED | Y | EXCEPTION | GPS < 30 MINUTES | STOP IN PROGRESS > 30 MINUTES |
| 3 RED | LOGGED IN DISPATCH EXCEPTION NO GPS | Y | EXCEPTION | GPS > 30 MINUTES | UNKNOWN (REQUIRES GPS) |

FIG. 4

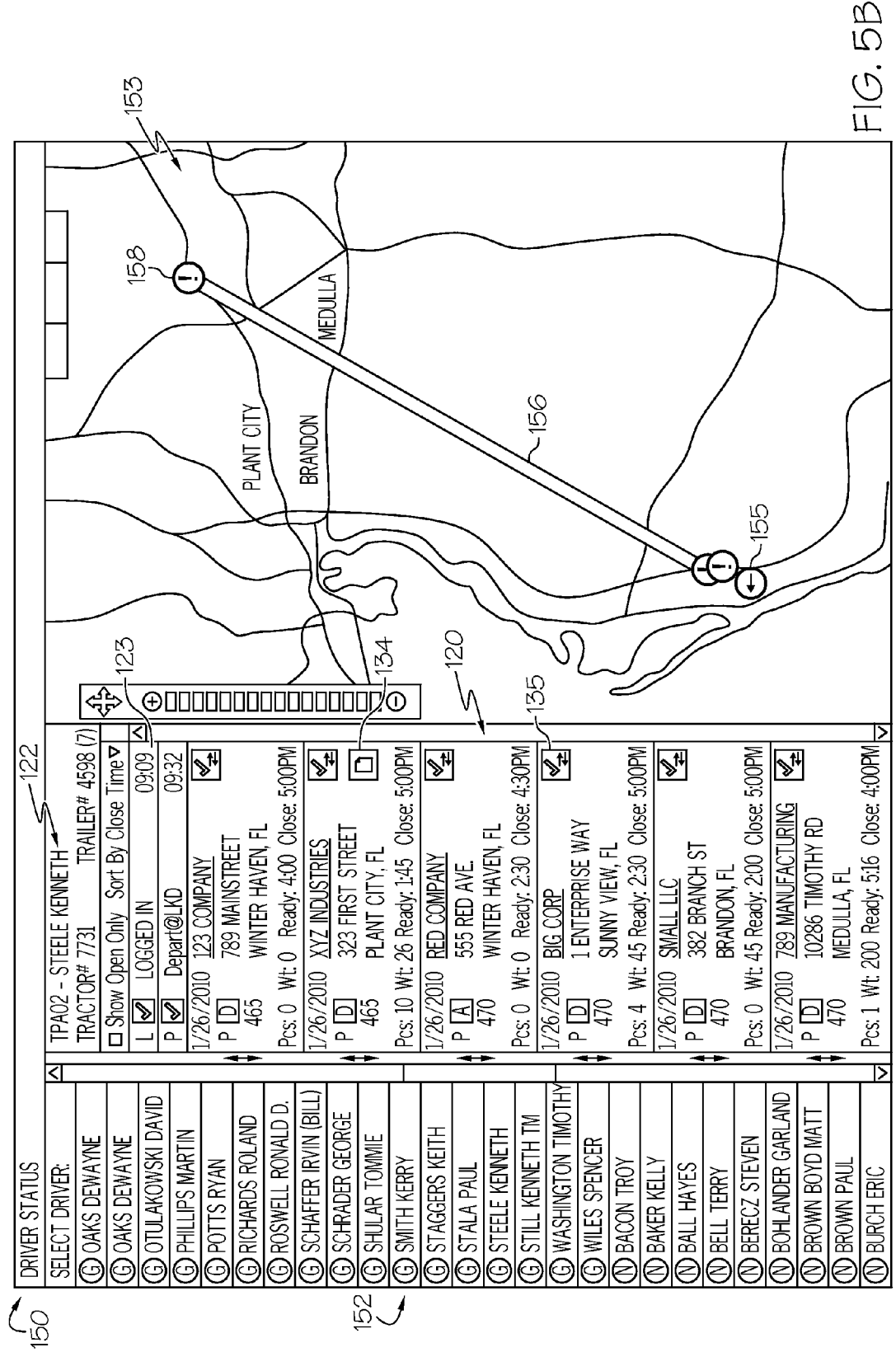

INTELLIGENT WIRELESS DISPATCH SYSTEMS

TECHNICAL FIELD

The present invention relates generally to dispatching systems for dispatching a plurality of vehicles in a vehicle fleet and, more particularly, to intelligent wireless dispatch systems capable of wirelessly and dynamically performing dispatching operations.

BACKGROUND

Many service industries such as the shipping and transportation industry, for example, utilize a fleet of vehicles that must be managed to meet customer requests. Dispatchers are personnel that receive incoming customer requests and communicate with the drivers of the fleet to ensure that the customer requests are met. In completing daily activities, dispatchers often verbally communicate with the drivers of fleet by radio communication.

Efficiency and speed are a necessity for meeting customer service levels. Requiring dispatchers to verbally communicate all aspects of each customer request, as well as other dispatching requirements such as cancellations, vehicle malfunction, etc., severely constrain the dispatcher. Not only must the dispatcher verbally communicate with the drivers, but also manage incoming requests, keep track of the status of each driver, and decide which driver to assign new customer requests. In many cases, the dispatcher must review several documents or take significant notes throughout the day to keep track of all of the vehicles and customer requests. All of these activities place a significant burden on the dispatcher and may affect customer service levels.

Accordingly, improvements in the efficiency and capability of dispatch systems and methods are desired.

SUMMARY

In one embodiment, an intelligent wireless dispatch system includes a dispatch computer having a processor and a computer readable medium tangibly embodying a set of executable instructions. The intelligent wireless dispatch system further includes one or more mobile data terminals configured to be positioned on a vehicle and in wireless communication with the dispatch computer. The set of executable instruction is configured to cause the processor to: display a plurality of drivers arranged in a driver stack on a graphical display coupled to the dispatch computer such that each driver of the plurality of drivers is associated with a vehicle, receive exception information from each mobile data terminal, display a driver icon corresponding to each driver in the driver stack such that a format of the driver icon indicates a driver status based at least in part on the exception information, and sort and display the drivers in the driver stack by the exception information. The set of executable instructions is further configured to display a driver assignment list for each driver comprising one or more assignments and wirelessly transmit an assignment message to one or more mobile data terminals according to an update to a selected driver assignment list. The mobile data terminals are configured to display the assignment message for acceptance or rejection of an assignment corresponding to the assignment message.

In another embodiment, an intelligent wireless dispatch system includes a dispatch computer, a first server coupled to the dispatch computer, a second server coupled to the dispatch computer, and one or more mobile data terminals. Each mobile data terminal is configured to be positioned on a vehicle and is communicably coupled to the first and second servers over a wireless communication network. The dispatch computer and the one or more mobile data terminals are configured to be in two-way voice communication via a voice over IP protocol over the wireless communication network. A dispatcher operating the dispatch computer may initiate a voice over IP communication session with one or more mobile data terminals routed through the first server and over the wireless communication network. A driver operating an individual mobile data terminal may send a call request to the dispatcher that is transmitted over the wireless communication network and routed through the second server, wherein the call request is added to a call request queue. Additionally, the dispatch computer and the one or more mobile data terminals are operable to exchange predefined text messages over the wireless communication network and routed through the second server.

In yet another embodiment, an intelligent wireless dispatch system includes a dispatch computer and one or more mobile data terminals configured to be positioned on a vehicle and in wireless communication with the dispatch computer. The dispatch computer is programmed to display a plurality of drivers arranged in a driver stack by an exception type and an exception time, wherein each driver of the plurality of drivers is associated with a vehicle. The dispatch computer is further programmed to receive exception information from each mobile data terminal and update the arrangement of the plurality of drivers in the driver stack in accordance with the exception information. Additionally, the dispatch computer and the mobile data terminals are configured to be in two-way voice communication via a voice over IP protocol over the wireless communication network. A dispatcher operating the dispatch computer may initiate a voice over IP communication session with mobile data terminals routed through the first server and over the wireless communication network. A driver operating an individual mobile data terminal may send a call request to the dispatcher that is transmitted over the wireless communication network and routed through the second server and added to a call request queue.

BRIEF DESCRIPTION OF THE DRAWINGS

While the specification concludes with claims particularly pointing out and distinctly claiming the present inventions, it is believed the same will be better understood from the following description taken in conjunction with the accompanying drawings in which:

FIG. 4 depicts exemplary exception rules according to one or more embodiments described and illustrated herein;

FIG. 5A-5D depict exemplary driver status screens of an intelligent wireless dispatch system according to one or more embodiments described and illustrated herein;

DESCRIPTION OF THE ILLUSTRATIVE EMBODIMENTS

In general, embodiments of the present disclosure are directed to dispatching systems for carrier operations. Embodiments may enable increased dispatcher and driver productivity utilizing integrated wireless dispatch to onboard computers. Embodiments also provide real-time or near real-time visibility to driver activity and enable management by exception to event-based status mechanisms. Real-time is defined herein as instantaneous updated information or information updated within a time-frame such that the dispatcher receives the updated information quickly (e.g., within several minutes). Additionally, embodiments described herein may provide voice over IP capabilities to enhance communication between a dispatcher and drivers of the fleet.

Figure 1:
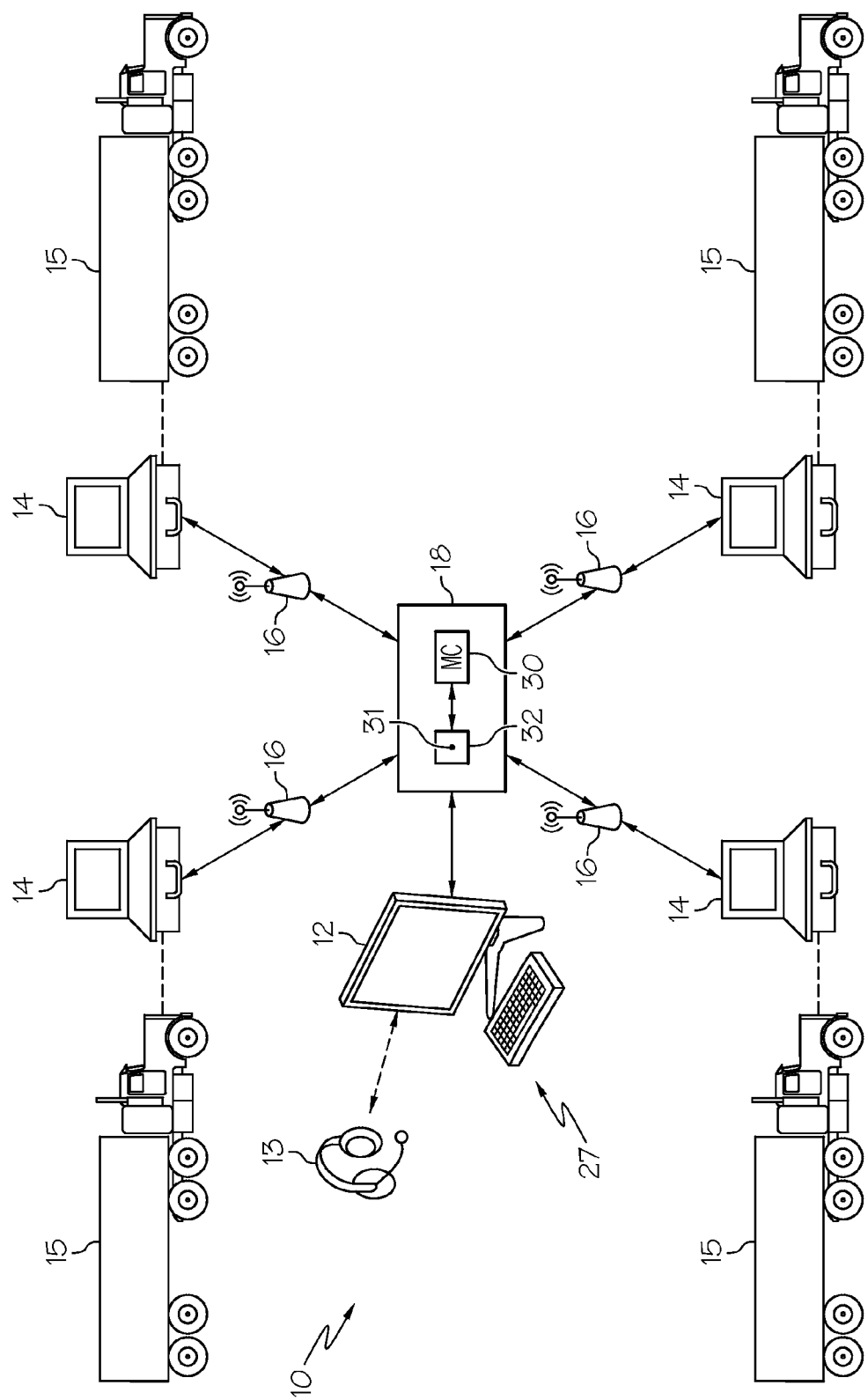
FIG. 1 depicts a schematic illustration of an intelligent wireless dispatch system according to one or more embodiments described and illustrated herein.

Referring now to FIG. 1, a schematic of an intelligent wireless dispatch system 10 of a vehicle dispatching enterprise is illustrated. The vehicle dispatching enterprise may comprise a city dispatch operation in which drivers pick up and deliver packages for customers within a defined geographical region such as a city or a group of nearby cities, towns or villages. Although certain aspects of the embodiments described herein may be described in the context of city dispatch operations, embodiments may also be utilized in line haul operations.

Figure 2:
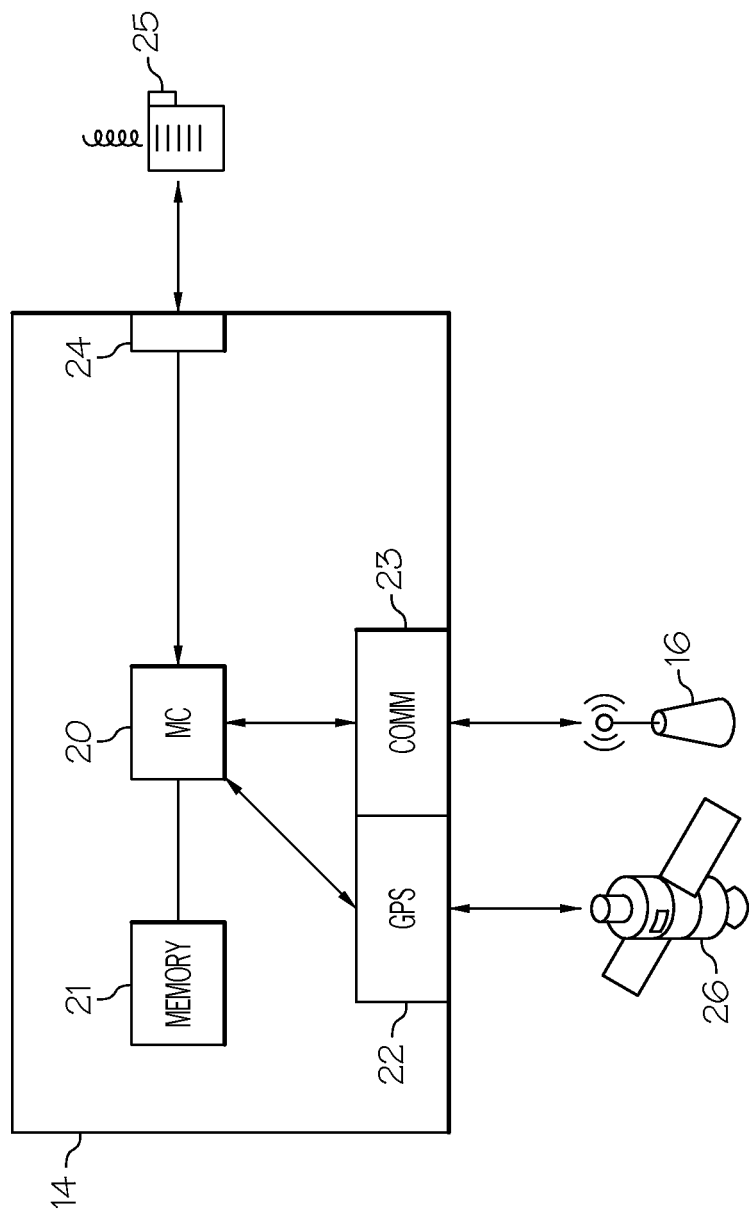
FIG. 2 depicts a schematic illustration of a mobile data terminal according to one or more embodiments described and illustrated herein.

Any number of vehicles 15 may be deployed within a geographic region at any one time. The vehicles 15 may be equipped with a field device such as a mobile data terminal 14 (MDT) (see U.S. Pat. No. 6,401,078 and U.S. Pat. Pub. No. 2009/0045924, which are hereby incorporated by reference herein). Referring to FIG. 2, the MDT 14 is an on-board computer that has a processor 20 coupled to a memory 21. The MDT 14 also comprises a communications module 23 configured to wirelessly communicate over a wireless network 16, such as a cellular network, a satellite network, a WiFi network, or the like. The MDT 14 may also comprise an input port 24 for receiving a communications interface 25 through which a driver may use to communicate with a dispatcher. The communications interface 25 may be a radio device such as a CB-type radio, an earpiece having a microphone, a cellular phone having Bluetooth capabilities, or other similar communications devices that enable a driver to verbally communicate with a dispatcher over the wireless communication network 16, as described in more detail below. The MDT 14 may be built into the vehicle 15 itself, or it may be a separate device which can be removed from the transportation vehicle.

Furthermore, the MDT 14 may include a global positioning satellite ("GPS") module 22 interfaced to the processor 20 for gathering and relaying location information via one or more satellites 26. Moreover, vehicle information associated with the MDT 14 may be stored within the memory 21. Vehicle information can include any of a variety of performance, diagnostic, and status information and is useful in creating real time communication. The GPS module 22 provides location information of the vehicle (and the items and packages) and directions to the driver of the transportation vehicle as well as position, direction of travel and safety information to the dispatcher.

As illustrated in FIG. 1, a plurality of vehicles 15 communicate with a dispatch computer 18 over one or more wireless networks 16. The dispatch computer 18 comprises a processor 30 and memory 32 comprising a set of executable instructions. The dispatch computer 18 may be configured as a general purpose computer or a server residing on an enterprise network, for example. The set of executable instructions further comprise a driver visibility module capable 31 capable of performing functionality of the embodiments described herein. A graphical display 12 and user input devices 27 (e.g., a keyboard, mouse, etc.) may be coupled to the dispatch computer 18 so that a dispatcher may access the driver visibility module 31 and various features of the intelligent wireless dispatch system 10. The dispatch computer 18 receives various data from each of the MDTs deployed in the field, such as vehicle location, vehicle position, vehicle speed, vehicle condition, and trailer capacity, among others.

The driver visibility module 31 is a program residing in the dispatch computer 18 or otherwise accessible to a dispatcher of a fleet of vehicles. The module 31 enables the intelligent wireless dispatch system 10 to provide a real-time view of the entire fleet that enables the dispatcher to quickly make dispatching decisions. The intelligent wireless dispatch system 10 enables a dispatcher to wirelessly dispatch assignments to drivers of the fleet with a click of a mouse as well as revise existing assignments dynamically, among other functionalities, as described herein.

Figure 3:
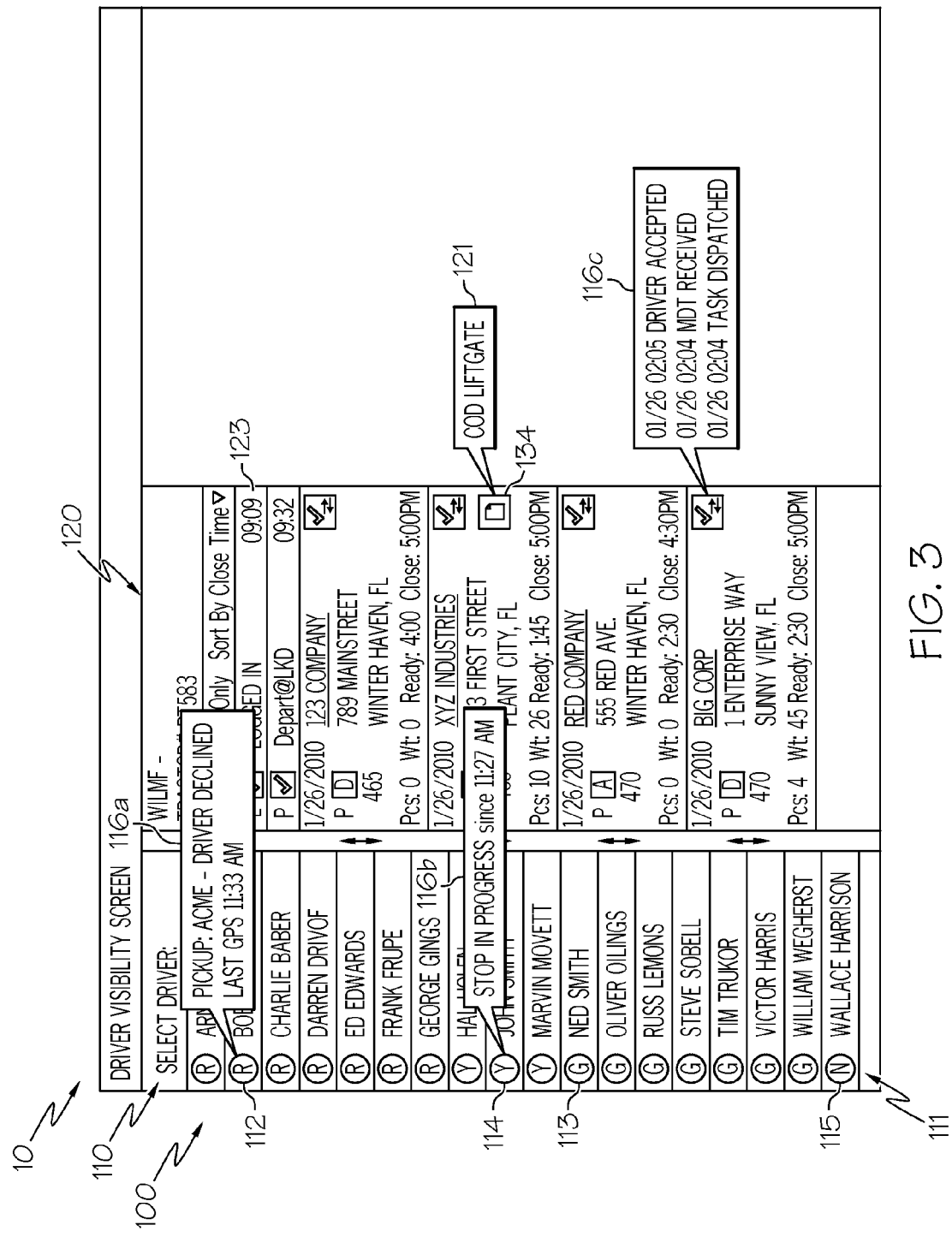
FIG. 3 depicts an exemplary driver visibility screen of an intelligent wireless dispatch system according to one or more embodiments described and illustrated herein.

Referring now to FIG. 3, the dispatch computer 18 of the intelligent wireless dispatch system is programmed (via the driver visibility module) to display a driver visibility screen 100. All of a driver's activities and assignments may be viewed in a chronological display allowing a dispatcher to quickly assess each driver's status or situation to make efficient and accurate dispatching decisions. All of the information that a dispatcher needs is provided on this single screen so that the dispatcher does not need to navigate through multiple screens to collect the relevant dispatching information.

The driver visibility screen 100 also displays a driver stack 110 that includes a list of drivers that the dispatcher is responsible for. Typically, the dispatcher is responsible for dispatching drivers within a particular geographic area. Next to each driver's name within the driver stack 110 is a driver icon 111 that provides a visual indication regarding the status of the corresponding driver. The driver's status is determined by exception information that is generated by the driver's schedule, the driver's actions, and/or equipment such as the driver's trailer, vehicle or MDT. The driver's status may be updated based on information that has or has not been received from the MDT. The exception information includes an exception type and a time of the exception. An exception is defined herein as an event that may affect a driver's ability to perform existing and/or potential assignments as well as an event that may affect the dispatchers ability to effectively dispatch a driver. Exceptions may include, but are not limited to, dispatch exceptions, stop exceptions, GPS exceptions and login exceptions.

Dispatch exceptions may include the situation where a dispatcher has sent an assignment transmission to the MDT of a particular driver and a transmission error occurs where the assignment cannot be transmitted to the MDT within a prescribed period of time, such as ten minutes for example. A dispatch exception may also be generated when a driver declines an assignment for a particular reason, such as when the driver believes that he or she does not have enough time to complete the assignment, or the driver believes that his or her current trailer load prevents him or her from handling the assignment. Another situation in which a dispatch exception may be generated includes where the driver does not acknowledge a successfully transmitted assignment within a prescribed period of time. Dispatch exceptions are typically severe enough to affect customer service and are displayed prominently so that the dispatcher is aware of the various dispatch exceptions for each driver in the driver stack 110, as described in more detail below.

Stop exceptions may include the situation where a vehicle of a driver has been stopped longer than a prescribed period of time (e.g., thirty minutes). For example, if a driver is supposed to be stopped at a customer for one hour and the GPS module of the MDT provides a positional signal to the dispatch computer indicating that the driver and vehicle have been stopped for an hour and forty-five minutes, the intelligent wireless dispatch system may generate a stop exception. A stop exception may also be generated when the GPS module of the MDT indicates that a driver has made an unscheduled stop. Stop exceptions may enable a dispatcher to easily determine where driver productivity may be impacted with a future assignment. It is noted that the intelligent wireless dispatching system may also track the progress of a driver to his or her destination via the GPS module of the MDT.

A GPS exception may be issued when expected GPS data has not been received on a timely basis from a deployed MDT. For example, the MDT may provide either no GPS data or faulty/suspect GPS data. In these cases, a GPS exception is generated. A login exception is generated when a driver has attempted to log into the system and there is an issue that requires the dispatcher to confirm/validate the login request.

The driver status of every driver in the driver stack 110 is condensed into the driver icon 111 positioned adjacent the driver's name. Driver icons corresponding to a driver status having no exceptions or exceptions that do not impact customer service levels, driver productivity or dispatcher visibility may be coded according to a particular format. Various formats may include shapes, sizes, symbols and colors. Although the driver icons may be described herein in the context of having differentiating colors, it is to be understood that other formats may be utilized.

Driver icons having a first color (i.e., a first format) such as green, for example, and may appear third in the driver stack 110 (e.g., green driver icon 113). Driver icons corresponding to a driver status having exceptions that may impact driver productivity and/or dispatcher visibility (e.g., the ability of the dispatcher to monitor a driver's progress) may be coded a third color (i.e., a third format), such as yellow, for example, and appear second in the driver stack 110 (e.g., yellow driver icon 114). Driver icons corresponding to a driver status having exceptions that may potentially impact customer service levels (e.g., the dispatch exceptions described above) may be coded a second color such as red (i.e., a second color), for example, and appear first in the driver stack 110 (e.g., red driver icon 112). Finally, driver icons corresponding to a driver status indicating an inactive driver (e.g., a driver that has not logged into or has not attempted to log into the system) may be coded a fourth format (e.g., gray icon 115), for example, and may appear at the bottom of the driver stack 110 so as to not distract the dispatcher. In another embodiment, those inactive drivers may not be displayed in the driver stack such that only active drivers are visible to the dispatcher. Within each level of exception priority, drivers are sorted by oldest exception to newest exception in accordance with the time of the exception. This organizational method ensures that the highest priority issue that has been outstanding for the longest period of time is at the top of the driver stack 110 and highly visible to the dispatcher so that the dispatcher may quickly take appropriate action.

The intelligent wireless dispatch system is updated in real-time or close to real-time such that when a driver status changes for a particular driver, the associated driver icon 111 quickly changes color and the driver's name is rearranged within the driver stack 110. For example, if a driver's current driver icon indicates a green status and the driver declines an assignment that was wirelessly transmitted to the driver's MDT, the driver driver icon will change to red and the driver's name will move up within the driver stack 110 such that the driver's name is the last driver listed within the list of drivers having red driver icons.

More detailed color coding rules for the driver icons are illustrated in the chart of FIG. 4. As an example, a green driver icon may be provided next to a driver who is not stopped, does not have a dispatch exception and whose GPS signal is being successfully received. A green driver icon may also be present if the mobile data terminal of an associated driver does not have GPS capability. A yellow driver icon may be provided when a driver has either stopped for longer than a prescribed time (e.g., thirty minutes), or a GPS signal has not been received by the dispatch computer in more than a prescribed time (e.g., thirty minutes). A red driver icon may be provided when a dispatch exception occurs.

In some embodiments, the driver stack may also be sorted by criteria other than exceptions. Therefore, the system may be customizable according to dispatcher preferences. For example, the dispatcher configure the system such that certain drivers are not visible within the stack 110. The drivers within the driver stack 110 may be sorted by other criteria, such as by drivers that have been cleared to return to the terminal, drivers that are behind schedule, drivers still on assignments, hours of service (e.g., drivers having met the hours requirement, drivers with hours remaining), by trailer capacity, driver history (e.g., percentage of declined assignments), or distance from the terminal or a customer location, by line-haul drivers inbound to a terminal, by line-haul drivers outbound to a terminal, and by dispatch area, for example.

By providing a sorted and color coded list of drivers in the driver stack 110, the system 10 makes it easy and efficient for dispatchers to keep track of all their drivers. The driver visibility screen 100 is also configured to display a hover message containing an exception summary when the dispatcher moves his or her mouse pointer over a driver. For example, hover message 116a, which corresponds to a red driver icon 112, indicates to the dispatcher that driver Bob Arnold declined a pickup at Acme and last provided a GPS signal at 11:33 AM. Hover message 116b, which corresponds to a yellow driver icon 114, indicates that driver Steve Sobell has been stopped since 11:27 AM. The hover messages provide the dispatcher with detailed information without requiring the dispatcher navigate through several screens to obtain the exception information. If a driver has multiple exceptions to be displayed within the hover message, the exceptions may be sorted by exception type. For example, the order of exception types may be as follows: 1) dispatch exception, 2) stop exception, 3) GPS exception, and 4) login exception. It should be understood that other exception type organizational methodologies may also be utilized. If there are multiple exceptions of the same type, the oldest exception may be displayed first with the following exceptions of the same type sorted by descending age. This may ensure that the first item the dispatcher sees is the most critical item to address.

The driver visibility screen 100 also comprises a driver assignment list 120 that is visible when the dispatcher selects a particular driver in the driver stack 110. The dispatcher may select a driver by single-clicking on the selected drivers name, for example. As described in more detail below, the driver assignment list includes a listing of assignments that are currently assigned to the selected driver. Various information may be provided within each assignment entry.

Referring now to FIGS. 5A-5D, a dispatcher may view a detailed driver status screen 150 particular to a selected driver. The dispatcher may cause the detailed driver status screen 150 to appear on the graphical display by using a navigational menu or tab system. To view more detailed status information related to a selected driver, the dispatcher may click on the driver's name in a driver list 152 and a detailed itinerary in the form of a driver assignment list 120 may be displayed along with a map 153 showing the driver's current location 155, planned route 156, and all stops 158, among other information. Other information may also be displayed and be available to the dispatcher, such as previous stop information, planned stop information (i.e., stops in which a driver is scheduled), unplanned stop information (i.e., stops that a driver made that were not scheduled or dispatched), actual route information (i.e., the order in which a driver actually completed his or her stops), planned route information (i.e., the order of planned stops) unassigned stop information (i.e., pickup requests that have not yet been assigned), and a display of the location of the terminal.

Figure 5A:
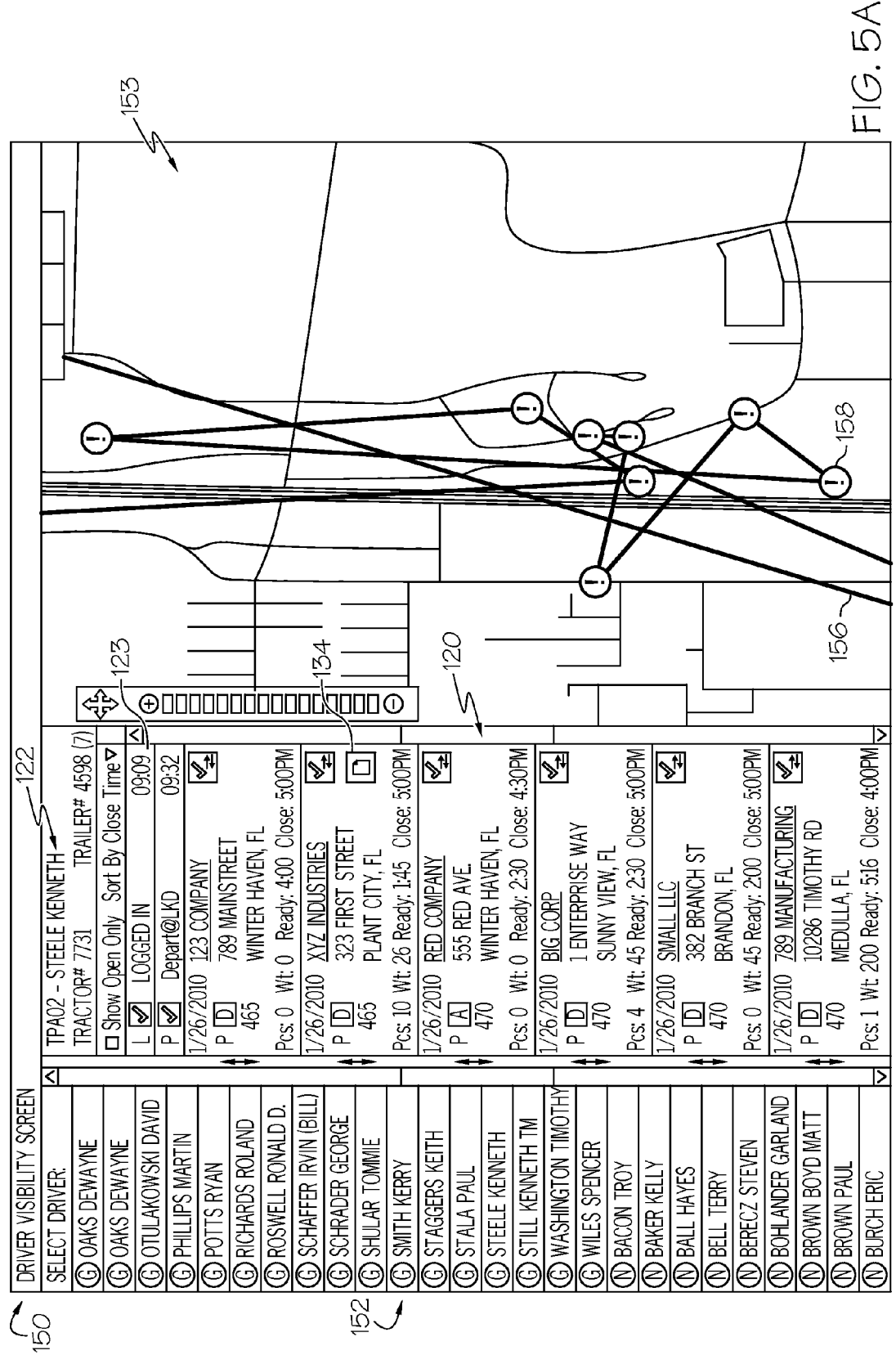

The integrated map 153 may be displayed as a street view, an aerial view, or a combination of both. FIG. 5A illustrates a combination street and aerial view map while FIG. 5B illustrates a street view map. Upon display, the map 153 may be automatically sized to fit all stops 158 on the screen. This may minimize the need for the dispatcher to perform map manipulations to obtain a usable view. Stops, which may comprise assignments dispatched by the dispatcher, are indicated as a stop icon 158 on the map 153 and may be coded (e.g., color, format or shape coded) to indicate if the stop was scheduled or unscheduled.

Figure 5C:
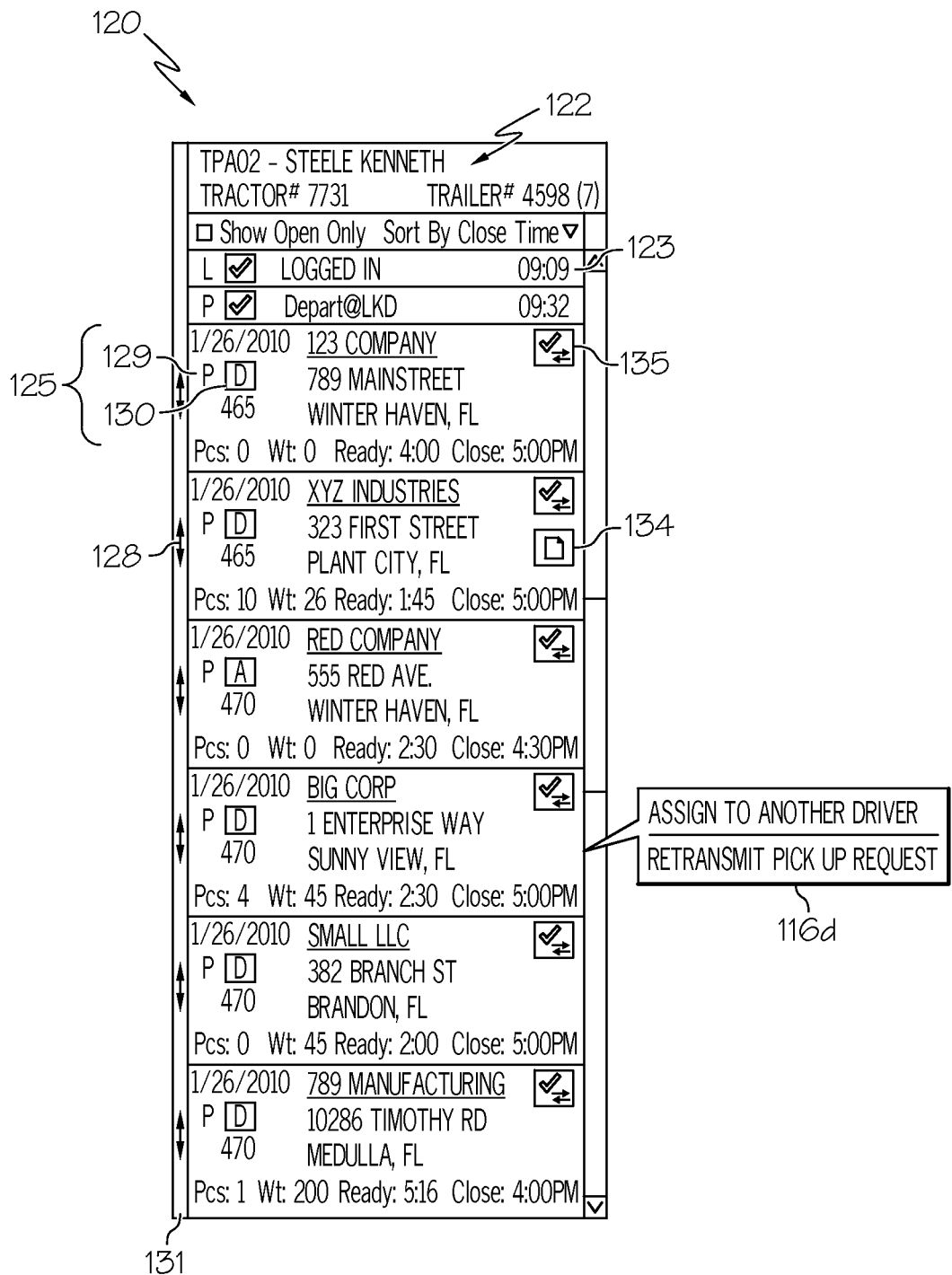

Referring specifically to FIG. 5C, the driver assignment list 120 provides information that a dispatcher may need in performing his or her dispatching duties. The driver assignment list 120 provides a list of assignments 125 as well as additional information in area 122 such as driver name, tractor number, trailer number, and current available trailer capacity. Other information that may be displayed in the driver status screen 150 includes, but is not limited to, a tractor (vehicle) number, MDT ID number, trailer number(s), current available trailer capacity, driver schedule, logged in status and time 123, driver type (e.g., pick-up and delivery drivers, team drivers, driver license type, etc.), a time that the driver left the terminal and a start/stop time of the driver's shift. The detailed driver status screen 150 also enables a dispatcher to quickly view the occurrence of events such as when a driver clocks or logs in, when a driver clocks or logs out, when a vehicle has been powered off, when a trailer is hooked to a vehicle, when a driver departs from a terminal, when a driver arrives at a terminal, a planned stop and associated start and stop time, an unplanned stop and associated start and stop time, when a shipment has been delivered to a customer, when a shipment has been picked up from a customer, when a document has been scanned (e.g., a bill of lading), when a state boarder has been crossed, a slip point (i.e., a driver meeting location in a long route) arrival, a slip point departure, when a driver has been cleared by the dispatcher (e.g., when a dispatcher has verified that a driver has completed his or her assigned pick-up and deliveries), when fuel disbursement has occurred, and when a trailer has been unhooked, among others. In one embodiment, the detailed driver status screen 150 may also depict when the driver was cleared to return to the terminal and when the driver actually returned to the terminal, as well as when a driver arrived at the terminal and when the driver actually clocked out.

The list of assignments comprises a plurality of individual assignments 125 displaying assignment information associated therewith. An assignment may be a pickup assignment, a delivery assignment, or other types of assignments or tasks. The type of assignment may be designated by assignment type icon 129 to indicate whether the assignment is a pickup ("P") or a delivery ("D"), for example.

For each pickup assignment, the dispatcher may view the customer (i.e., shipper) name, shipper address, the geographic area the shipper is assigned to (e.g., a driver's area that he or she services), the earliest pickup time, the latest pickup time, the expected number of handling units, the expected total weight, any shipping notes regarding the shipper or pickup, any special instructions, the assignment status, and the dispatch status. It should be understood that more or less of the above-information may be displayed regarding pickup assignments. In one embodiment, the special instructions may be viewed by clicking a special instructions icon 134 that causes a pop-up message 121 (see FIG. 3) to appear that lists the special instructions associated with the pickup assignment 125. Special instructions may include, but are not limited to, inside pickup service, residential pickup service, guaranteed service, lift gate required, cash on delivery, and rollup required.

For each delivery assignment, the dispatcher may view the consignee name, the consignee address, the geographic area the shipper is assigned to, the shipment reference ID (e.g., the pro number), the number of handling units, the total weight, any notes regarding the consignee or delivery any special instructions, the assignment status, and the dispatch status. It should be understood that more or less of the above-information may be displayed regarding the delivery assignment. As described above with reference to the pickup assignment, special instruction may be viewed by clicking a special instructions icon 134.

To ensure that the dispatcher is viewing current information, the system automatically refreshes the status information. In one embodiment, all of the information provided to the dispatcher is automatically refreshed in real time. In another embodiment, the information provided to the dispatcher is refreshed in different intervals to minimize server load and data transmission overhead. For example, in one embodiment, the driver stack 110 updates every sixty seconds. This ensures that the dispatcher has the necessary information to manage in accordance with the exceptions. The exception information contained in the hover messages is retrieved and updated in real-time. In the event that the driver icon has not updated, the real-time hover message ensures that the dispatcher is working with current information. In this exemplary embodiment, the detailed driver status screen 150 and integrated map 153 update every there minutes. Given that the dispatcher is likely going to be switching between drivers to resolve exceptions and dispatch tasks on a frequent basis, the three minute interval provides a good tradeoff while increasing system performance.

The intelligent wireless dispatch system 10 provides for easy dispatcher assignment of assignments/tasks by implementing a drag-and-drop procedure. Referring to FIG. 5C, each assignment 125 may comprise an arrow 128 in which the dispatcher may select with a mouse pointer (or otherwise select) and move up or down within the driver assignment list 120 to redefine the order in which the assignment should be completed in. It should be understood that in other embodiments the assignments may be rearranged by other means.

Each assignment is assigned a discontinuous stop number to identify the assignment and minimize the amount of information that needs to be sent to the MDT. As an example, Stop #1 may be 10000, Stop #2 may be 20000 and Stop #3 may be 30000. This allows for Stop #3 to be inserted as stop 15000 between Stop #1 and Stop #2 without the numbers of Stop #2 and Stop #1 having to be changed and communicated to the MDT. Each time a Stop $X_n$ is inserted between two stops ($X_1$ and $X_2$), the Stop $X_n$ is assigned a stop number equal to $X_1+((X_1-X_2)/2)$. Use of discontinuous stop numbers may also prevent cascades in the order of the assignments and the transmission of additional data to make sure the correct assignments appear to the driver in the correct order. A large gap between the stop numbers allow for a greater number of assignment changes to occur.

When a task is assigned or dispatched to a driver, a dispatch status icon 130 appears on the assignment 125. Assignments that have been assigned to a driver but not yet dispatched to the driver's MDT are indicated by an assignment indicator (e.g., an "A" icon) and assignments that have been dispatched to a driver are indicated by a dispatch indicator (e.g., a "D" icon). Once a task is dispatched to a driver, each time the task is modified an update is automatically sent to the MDT. An assignment may be dispatched to a driver with a single mouse click. By clicking the "A" icon associated with a particular assignments, the assignment may be dispatched to the driver and the dispatch status icon 130 will change from and "A" icon to a "D" icon. Similarly, when a task has been completed by a driver, the dispatch status icon 130 may change to an icon shape that indicates the task has been completed. For example, the dispatch status icon 130 may change to a check mark to indicate to the dispatcher that the task has been completed.

Activation, selection, or hovering over the transmission status icon 135 causes a transmission status message 116c including information related to the dispatched assignment to appear (see FIG. 3). The intelligent wireless dispatch system 10 is programmed such that it filters certain transmission status and user action status information to provide the dispatcher with a concise summary of the information that may be necessary to understand the dispatch history of a specific assignment. User action status information indicates actions taken by a driver (e.g., declining an assignment). Filter rules may be implemented to exclude any status information that relates to previous iterations of the assignment being dispatch that are not noteworthy and can otherwise be assumed. Any status information where something abnormal has occurred may remain in the transmission status message 116c. This allows the dispatcher to view the current status along with the overall history of the assignment with a quick scan.

Exemplary filtering rules for filtering the information contained in the transmission status message may include, but are not limited to:

Show all Dispatch Actions (e.g., DISPATCH, UPDATED, CANCELLED);
Show all Driver Declines with a reason (e.g., DECLINED: LOAD, DECLINED:TIME);
Show the most recent transmission received by the MDT (XMIT);
Show any previous transmission received by the MDT (XMIT) where a driver response was not received;
Show NO DRIVER RESPONSE for any transmission received by an MDT (XMIT) where a driver response was not received;
Show PENDING DRIVER for any transmissions that have been received by the MDT and are pending a driver response; and
Show PENDING XMIT for any tasks where a dispatch/update/cancellation is pending transmission to the MDT.

It should be understood that embodiments are not limited to the codes (e.g., DECLINED: LOAD, XMIT, etc.) described herein and any other codes may be utilized. The following illustrates several examples of transmission status message scenarios:

Scenario: Pending Driver Response

PENDING DRIVER
03/20 12:16 XMIT
03/20 12:15 DISPATCHED
Scenario: Pending Transmission to MDT PENDING XMIT
03/20 12:15 DISPATCHED
Scenario: Driver Declines Task After Accepting 03/20 01:45 DECLINED: LOAD
03/20 12:46 ACCEPTED
03/20 12:16 XMIT
03/20 12:15 DISPATCHED
Scenario: Driver declines task 03/20 12:46 DECLINED: LOAD
03/20 12:16 XMIT
03/20 12:15 DISPATCHED
Scenario: Driver accepts task 03/20 12:46 ACCEPTED
03/20 12:16 XMIT
03/20 12:15 DISPATCHED
Scenario: Updated Task 03/20 01:18 ACCEPTED
03/20 01:03 XMIT
03/20 01:03 UPDATED
03/20 12:15 DISPATCHED
Scenario: Cancelled Task 03/20 01:08 ACKNOWLEDGED
03/20 01:03 XMIT
03/20 01:03 CANCELLED
03/20 12:15 DISPATCHED
Scenario: Multiple Updates 03/20 02:14 ACCEPTED
03/20 01:57 XMT
03/20 01:56 UPDATED
03/20 01:33 UPDATED
03/20 01:03 UPDATED
03/20 12:15 DISPATCHED
Scenario: Multiple Updates

03/20 02:14 ACCEPTED
03/20 01:57 XMT
03/20 01:56 UPDATED
03/20 01:51 ACCEPTED

-continued

```
03/20 01:33 UPDATED
03/20 01:18 DECLINED: TIME
03/20 01:03 XMIT
03/20 01:03 UPDATED
03/20 12:15 DISPATCHED
Scenario: Updated Task Where Previous Version Was Not Accepted 03/20 01:38 ACCEPTED
03/20 01:34 XMIT
03/20 01:33 UPDATED
NO DRIVER RESPONSE
03/20 01:03 XMIT
03/20 01:03 UPDATED
03/20 12:15 DISPATCHED
Scenario: Updated Task Where Previous Versions Were Not Accepted PENDING DRIVER
03/20 01:34 XMIT
03/20 01:33 UPDATED
NO DRIVER RESPONSE
03/20 01:03 XMIT
03/20 01:03 UPDATED
NO DRIVER RESPONSE
03/20 12:16 XMIT
03/20 12:15 DISPATCHED
Scenario: Assignment Changed 03/20 02:45 Driver Declined: LOAD
//Update pieces & weight
03/20 02:14 Driver Accepted
03/20 01:57 MDT Received
03/20 01:56 DispatcherID Updated Task
//Change order of task
03/20 01:18 Driver Accepted
03/20 01:34 MDT Received
03/20 01:33 DispatcherID Updated Task
//Change order of task
03/20 01:18 Driver Accepted
03/20 01:03 MDT Received
03/20 01:03 DispatcherID Updated Task
//Dispatch to driver
03/20 12:46 Driver Accepted
03/20 12:16 MDT Received
03/20 12:15 DispatcherID Dispatched Task
```

Figure 5D:
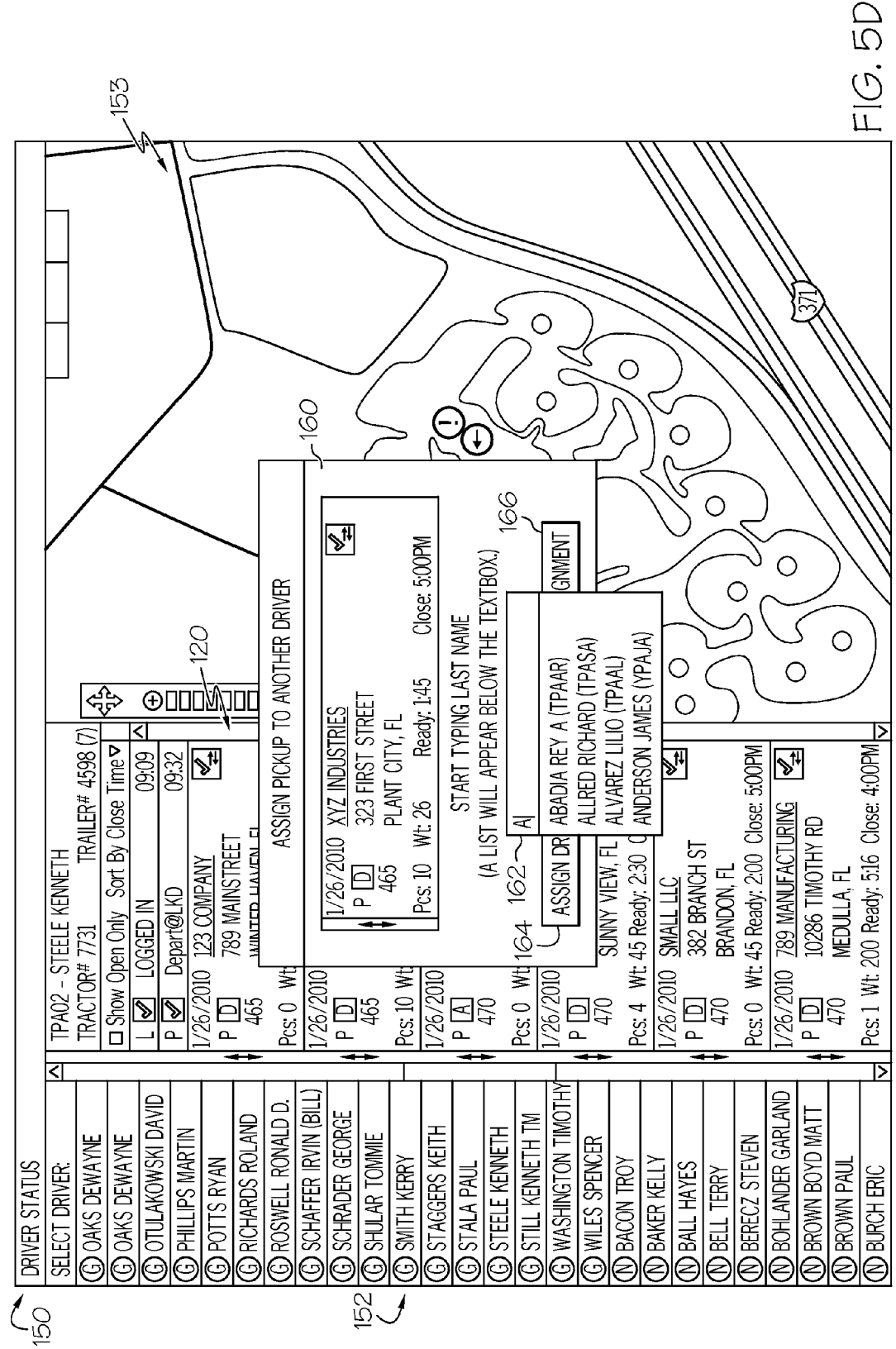

To make dispatchers as efficient as possible, the intelligent wireless dispatch system 10 employs context sensitive right click menus. Referring to FIG. 5D, common tasks for a dispatcher may include reassigning a previously dispatched task as well as re-transmitting tasks. Both of these options may be available as right click menu options 116d within the intelligent wireless dispatch system 10. Referring to FIG. 5C, the dispatcher may right click on a task to generate a right click menu 116d that may provide one or more menu options. As an example, if a dispatcher desires to reassign a task from a first driver to a second driver, he or she may select the "Assign to Another driver" menu option after right clicking on the assigned task. A dialog box 160 appears allowing the dispatcher to enter/select the driver in a textbox 162. The system may provide driver selection suggestions based on the letters that the dispatcher types into the textbox 162 to increase efficiency. In some cases, such as when the task is several hours in the future, the dispatcher may not want to yet dispatch the assignment to the driver but rather show as planned. The dialog gives the dispatcher the option of just assigning or assigning and dispatching the pickup assignment. For example, the dispatcher may assign and dispatch the pickup by pressing the assign and dispatch button 164 or just assign the task by pressing the assignment button 166 to show the task as planned. Additionally, if a driver declined an assignment and the dispatcher needs to retransmit the assignment, the dispatcher can simply select the "Retransmit Task" right click menu option. A dispatcher may retransmit an assignment for other reasons.

To streamline communications and allow the dispatcher to service a greater number of drivers and customers, the intelligent wireless dispatch system 10 may employ structured communications via the wireless data connection with task centric interfaces for both the dispatcher and driver. This minimizes the need for voice and free-form text communications between the dispatch and driver, which may save time and resources. Each action presents the user with an easy to navigate, context sensitive list of choices to select from. With a single button push the driver may convey a focused message related to a specific task to the dispatcher. The driver is therefore not required to type in a message, select a message macro from a list, verbally communicate with the dispatcher, or enter a stop or shipment ID, for example. The system may automatically gather and include data related to the event, task or subject being communicated.

Figure 6A:
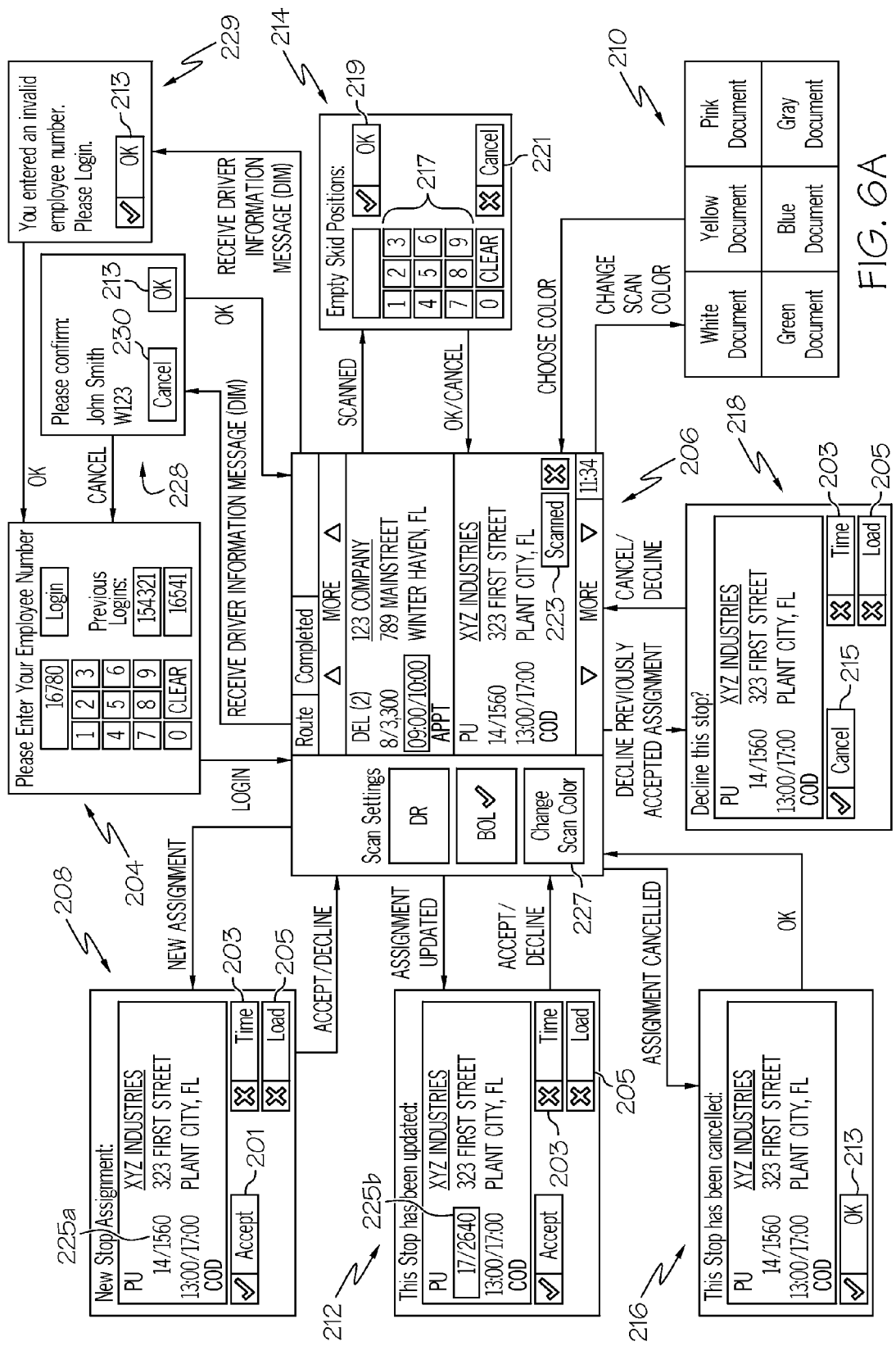
FIG. 6A depicts a flow diagram of a plurality of mobile data terminal screens according to one or more embodiments described and illustrated herein.

FIG. 6A is a schematic of a flow diagram 200 that illustrates exemplary user interface screens of an on-board computer such as an MDT and how the dispatcher and driver may efficiently communicate using structured communications. A description of various user interface screens will now be provided. When a driver enters his or her vehicle, such as at the beginning of a work shift, for example, he or she may turn on the MDT (or other similar on-board computer) so that a login screen 204 is presented on the display of the MDT. In another embodiment, the MDT may automatically start when the vehicle is started. The display of the MDT may comprise a touch screen so that a driver may input data and selections into the MDT via the display rather than by the use of other input devices, such as a mouse and keyboard, for example. The login screen 204 may include a numeric keypad, an alphabetic keypad or a combination of both through which the driver may enter his or her login number, which may be an employee identification number, for example. After the driver submits his or her login number, the login information is wirelessly transmitted to the dispatch computer for verification. In another embodiment, the MDT may include a card reader (e.g., magnetic, RFID or similar reader) in which a driver may present his or her employee badge to log into the system.

When a driver logs onto the MDT using her or her employee identification number, the intelligent wireless dispatch system retrieves the driver information associated with the transmitted employee identification number (e.g., first and last name). If the driver enters an incorrect employee identification number, the MDT may display an invalid employee number screen message box 229 that prompts the driver to press an OK button 213 to try to login again. If the driver enters a valid employee identification number, an identification verification screen or message box 228 for the driver to confirm his or her identity. If the name displayed in the identification verification message box 228 matches the name of the driver, the driver may press the OK button 213 to advance to a driver task screen 206 described below.

Figure 6B:
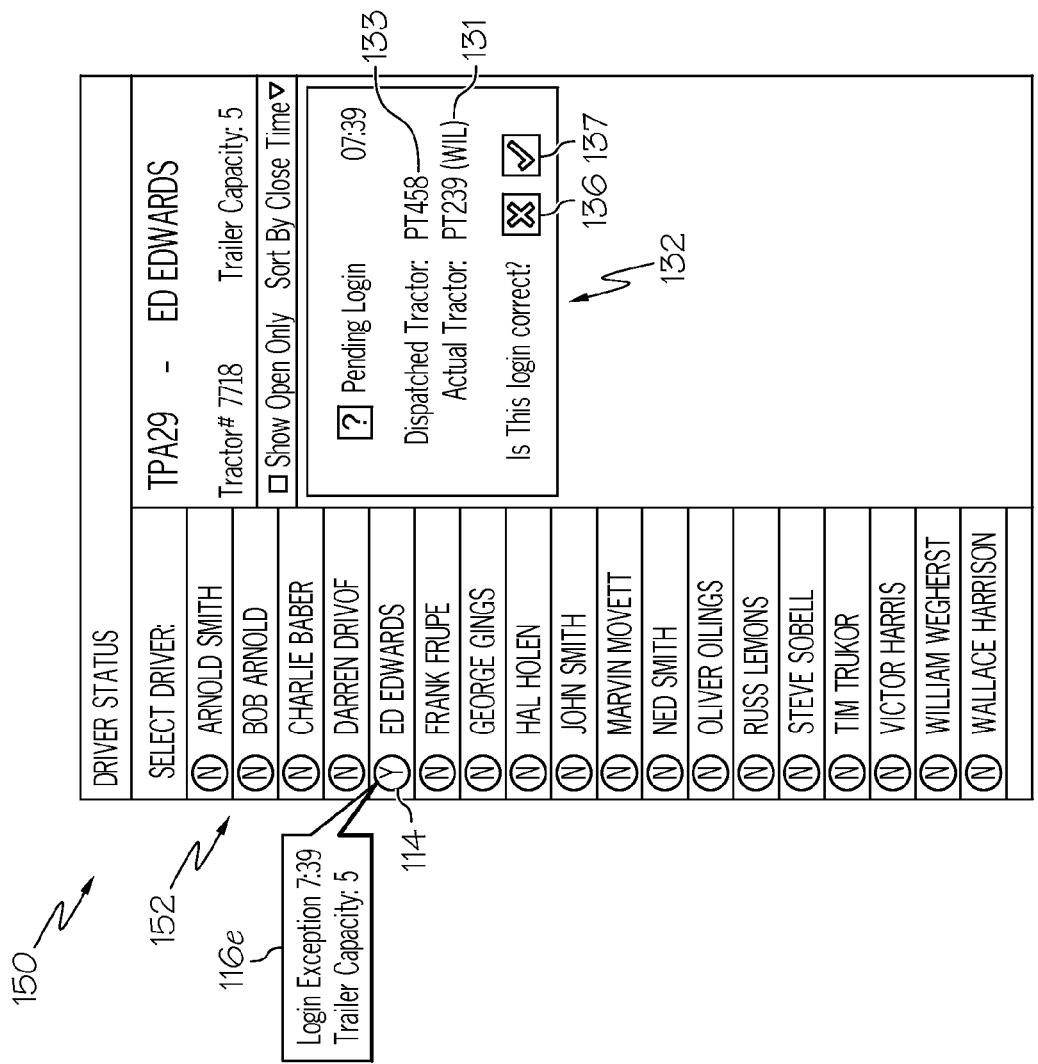
FIG. 6B depicts an exemplary driver status screen and pending login verification message of an intelligent wireless dispatch system according to one or more embodiments described and illustrated herein.

In one embodiment, enhanced login functionality is provided. When a valid employee number is entered and transmitted, the system then retrieves the vehicle number of the vehicle that the MDT is physically installed (MDT vehicle number) and the vehicle number of the vehicle that the driver was previously dispatched (dispatched vehicle number). If the two vehicle numbers match (i.e., the driver is logging into the system with an MDT that is in the same vehicle that he or she was dispatched in), the driver's login is approved and the driver may receive his or her assignments in the driver task screen 206. If the two vehicle numbers do not match, the login attempt is flagged as a Pending Login Request for the dispatcher to either approve or disapprove. FIG. 6B illustrates a Driver Status screen 150 in which a driver has a Login Exception because the number of the tractor (vehicle) associated with the MDT that he logged into does not match the number of the tractor that he was previously dispatched with.

When the dispatcher hovers the mouse over the driver icon 114 indicating the login exception, a pop-up message 116e may appear that provides information regarding the time of the login exception. Pending Login message box 132 may also appear. The Pending Login message box 132 includes the number of the dispatched tractor 133 (the vehicle number of the vehicle that the driver was dispatched) and the actual tractor number 131 (the number of the vehicle having the MDT that the driver login with). The dispatcher may indicate that the login information is correct by selecting the OK button 137. If the login information is incorrect, the dispatcher may deny the login request by selecting the deny button 136. If the dispatcher verifies that the login information is correct, the driver is logged into the system and the driver may receive his or her stop assignments at the driver task screen 206.

After a login is successfully verified, the MDT may display a driver task screen 206 that displays the various pickup and delivery tasks currently assigned to a driver. The driver may scroll up and down in the display to view the chronological list of his or her assignments as well as additional information as described below.

When the dispatcher transmits a new assignment to a driver, the intelligent wireless dispatch system 10 updates the display of the MDT with a new assignment screen 208 that contains information regarding a pickup or a delivery for driver review. For example, the new assignment screen may display whether the assignment is a pickup or a delivery, the name and address of the customer, the time of the assignment, and other information (e.g., whether the assignment is a cash on delivery ("COD") assignment, the number of handling units and the total weight of the freight to be picked up). Also provided on the new assignment screen 208 are large-sized driver input selections. In the illustrated embodiment, the driver input selections include Accept button 201, Decline: Time button 203 and Decline:Load button 205. The buttons are configured as a large size so that a driver may easily make a selection, even if he or she is wearing gloves.

To accept a new assignment, the driver may press or otherwise select the Accept button 201, to wirelessly transmit a structured acceptance message from the MDT to the dispatch computer. In this manner, the driver does not need to type a message or verbally accept the new assignment to the dispatcher. Once the structured acceptance message is received at the dispatch computer, the intelligent wireless dispatch system 10 will update the driver stack 110 on the dispatcher's display and also update the driver task screen 206, which will be visible after the driver presses the Accept button 201 (see FIG. 1).

To decline a new assignment, the driver may press or otherwise select the Decline:Time button 203 or the Decline: Load button 205. A driver may press the Decline:Time button 203 if the driver does not believe that he or she has enough time to complete the assignment in accordance with the deadline indicated in the new assignment screen 208. A driver may press the Decline:Load button 205 if the driver believes that his or her trailer does not have the capacity to accept the load requirements indicated by the new assignment screen 208. In each instance, when a driver declines a new assignment, a corresponding message is sent to the dispatch computer 18 indicating that the driver has declined an assignment. The intelligent wireless dispatch system 10 then generates a dispatch exception for that driver and updates the relevant information accordingly as described above (e.g., the color of the driver icon 111 associated with the driver may change to indicate an exception).

Additionally, the dispatcher may send an update to an assignment that has previously been assigned to a driver. When a task is updated by the dispatcher, the intelligent wireless dispatch system 10 automatically transmits a status update to the MDT of the appropriate driver. The status update may appear on the display of the MDT as an assignment update screen 212 that displays information related to the revised assignment. The revised assignment requirements may be highlighted so that the driver may readily see what information has changed to make a determination as to whether he or she can still meet the requirements of the assignment. For example, the exemplary original new assignment screen 208 illustrated in FIG. 6A displays fourteen pieces and a total weight of 1,560 lbs at region 225a. The assignment update screen 212 displays a highlighted region 225b that indicates the number of pieces has been increased to seventeen and the total weight has been increased to 2,640 lbs. The driver is prompted to reconfirm acceptance of the assignment in case any of the changes would affect his or her ability to perform the recently revised assignment by use of the Accept button 201, Decline:Time button 203 or Decline: Load button 205 as described above.

If an assignment has been cancelled, the system 10 may automatically send a cancellation notification to the MDT of the appropriate driver. An exemplary assignment cancellation screen 216 is illustrated in FIG. 6A. The driver may confirm receipt of the cancellation notification by pressing the OK button 213, which transmits a confirmation communication message back to the dispatch computer 18 and the dispatcher. As described above, if a dispatched assignment is reassigned to a different driver, the original driver is automatically notified that the assignment has been cancelled and the new driver is notified of the new assignment. The functionality of this structured communication may significantly ease the communications burden on the dispatcher as well as the driver, thereby increasing efficiency.

A driver may also utilize the driver task screen 206 displayed on the MDT to decline a previously accepted assignment. For example, a driver may have encountered problems such as traffic or vehicle issues while completing his or her assigned tasks/assignments. The driver may select the assigned task on the driver task screen 206 to generate a decline assignment screen 218. The driver may decline the previously assigned task by pressing or otherwise selecting the Decline:Time button 203 or Decline:Load button 205, or may cancel the decline assignment screen 218 by pressing the Cancel button 215. Once a driver declines a previously assigned and accepted task, a notification is sent to the dispatch computer 18 and the task is updated to reflect its declined status so that the dispatcher may take appropriate action. An exception for the driver that declined the assignment may also be generated.

A driver may scan a bill of lading (BOL) associated with a recently completed pickup by using a built-in scanner of the MDT. The driver may select a Scanned button 223 located on the driver tasks screen 206 and associated with the pickup assignment that was recently completed. A trailer capacity update screen 214 may then be generated in response to the scanned BOL that may prompt the driver to enter the remaining trailer capacity. The remaining trailer capacity may be an important metric for dispatchers as they plan for future assignments. After the driver enters the trailer capacity (e.g., the number of empty skid positions), the MDT may send a first message to the dispatch computer 18 that the assignment has been completed, which results in task assignment status being updated, and a second message indicating the available trailer capacity. Once these messages are received by the system 100, the task status icon 130 associated with the particular assignment may be updated to reflect that the assignment has been completed (e.g., the task status icon 130 may be changed from a "D" to a checkmark). Further, the trailer capacity associated with the driver may also be updated in area 122 to reflect the updated trailer capacity. This structured communication eliminates the need for the dispatcher to perform a radio call to the driver.

Particular transportation documents may be printed on colored stock. To adjust the scanning properties of the on-board scanner, the driver may select a Change Color button 227 to initiate a change color screen 210 comprising a color grid from which the driver may select the desired document color. By selecting the appropriate color (e.g., "Yellow Document"), the scanner of the MDT may be adjusted to optimally scan the yellow document.

Much of a dispatcher's time is spent taking customer requests and determining the best driver to complete the task while meeting customer expectations and minimizing costs. Customer requests come in throughout the day and often require planned assignments to be revised in order to meet customer expectations while minimizing costs. When evaluating how to best service a particular pickup request, the dispatcher typically needs several pieces of information, such as: 1) customer request information including, but not limited to, ready time, close time, location, estimated number of handling units and total weight; (2) the default driver assignment for a given shipper based upon static driver routes; and (3) currently deployed drivers and their current assignments along with trailer capacity and standard work schedule (e.g., drivers that start early in the day or drivers that start late in the day).

Figure 7:
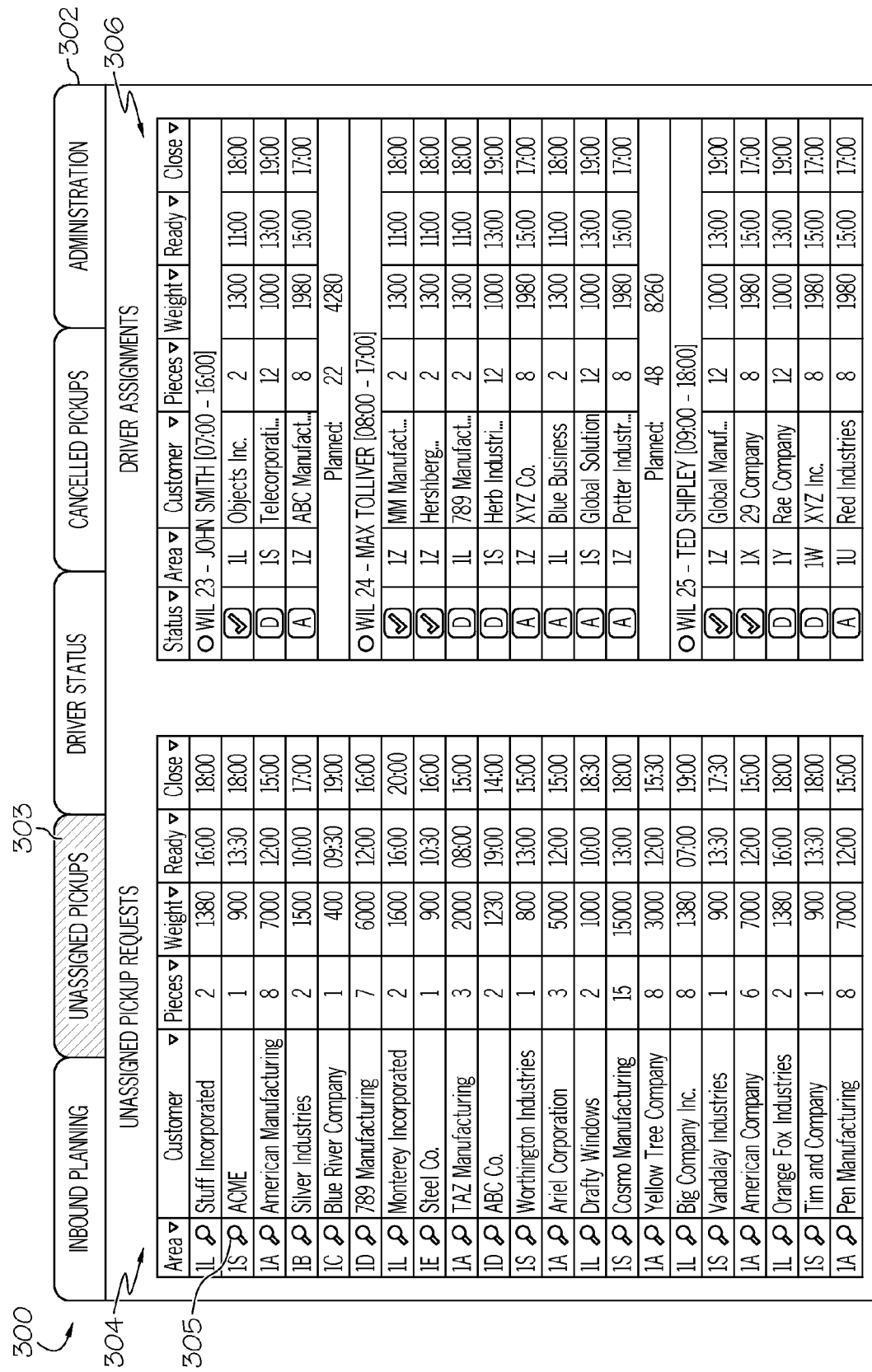
FIG. 7 depicts an exemplary unassigned pickup screen of an intelligent wireless dispatch system according to one or more embodiments described and illustrated herein.
Figure 8:
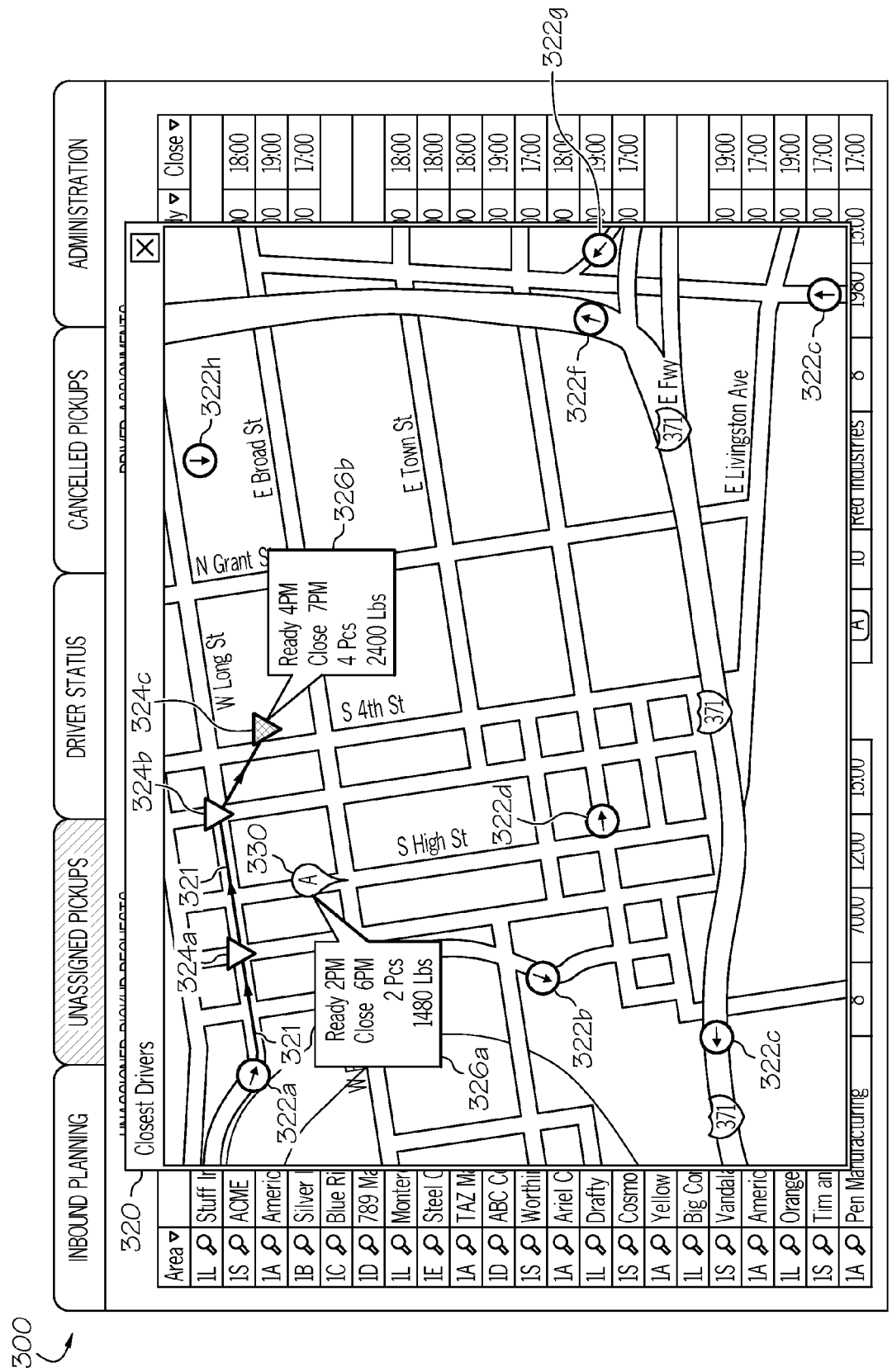
FIG. 8 depicts an exemplary map view of an unassigned pickup screen of an intelligent wireless dispatch system according to one or more embodiments described and illustrated herein.

FIG. 7 is an exemplary unassigned pickups screen 300 of the intelligent wireless dispatch system 10 that provides information to the dispatcher in an optimized format. On the left side is an unassigned customer pickup request list 304 comprising customer pickup requests that have not been assigned to a driver. Each row provides information relating to an individual unassigned customer pickup request including, but not limited to, pickup area, customer name, the number of pieces, the time the pickup will be ready and the time the customer closes. The magnifying glass 305 of each pickup request presents a graphical map display 320 showing the unassigned pickup assignments 330, the nearest drivers (e.g., circle and arrow 322, among others) and their routes (e.g., route 321) as illustrated in FIG. 8. The area may be clicked to cause the driver assignments list to display the driver that normally handles that geographic area. For example, a dispatcher may click area "1L" associated to cause a driver list 306 to display the drivers that service area 1L as well as the drivers' current assignments.

The driver list 306 may display the drivers' current assignments including status (assigned, dispatched) along with their normal work schedule and available trailer capacity. A pickup can be assigned to a driver by dragging an unassigned pickup request from the unassigned pickup request list 304 and dropping it onto the driver's route in a desired location. For example, the unassigned pickup request for the Blue River Company may be dragged from the unassigned pickup request list 304 and placed in driver Max Tolliver's route between the assignment for XYZ Co. and Blue Business. This action by the dispatcher also updates the sequence of the assignments that the driver should execute. An assignment or stop can also be moved from one driver to another through a similar action or by a right click menu option. The driver list 306 may have a scroll feature such that the driver may scroll up and down within the list.

Figure 9:
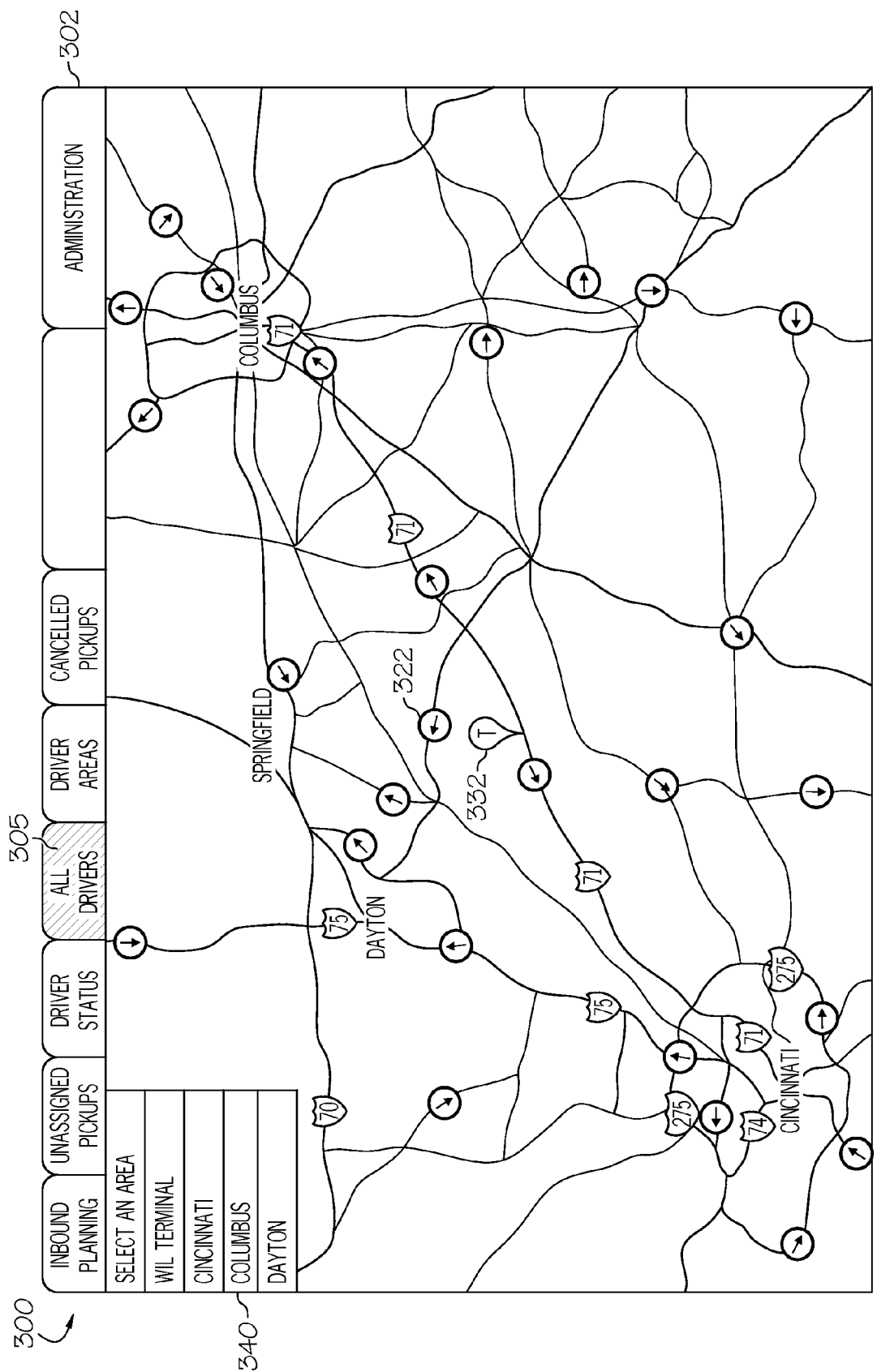
FIGS. 9 and 10 depict an exemplary terminal map view of an intelligent wireless dispatch system according to one or more embodiments described and illustrated herein.
Figure 10:
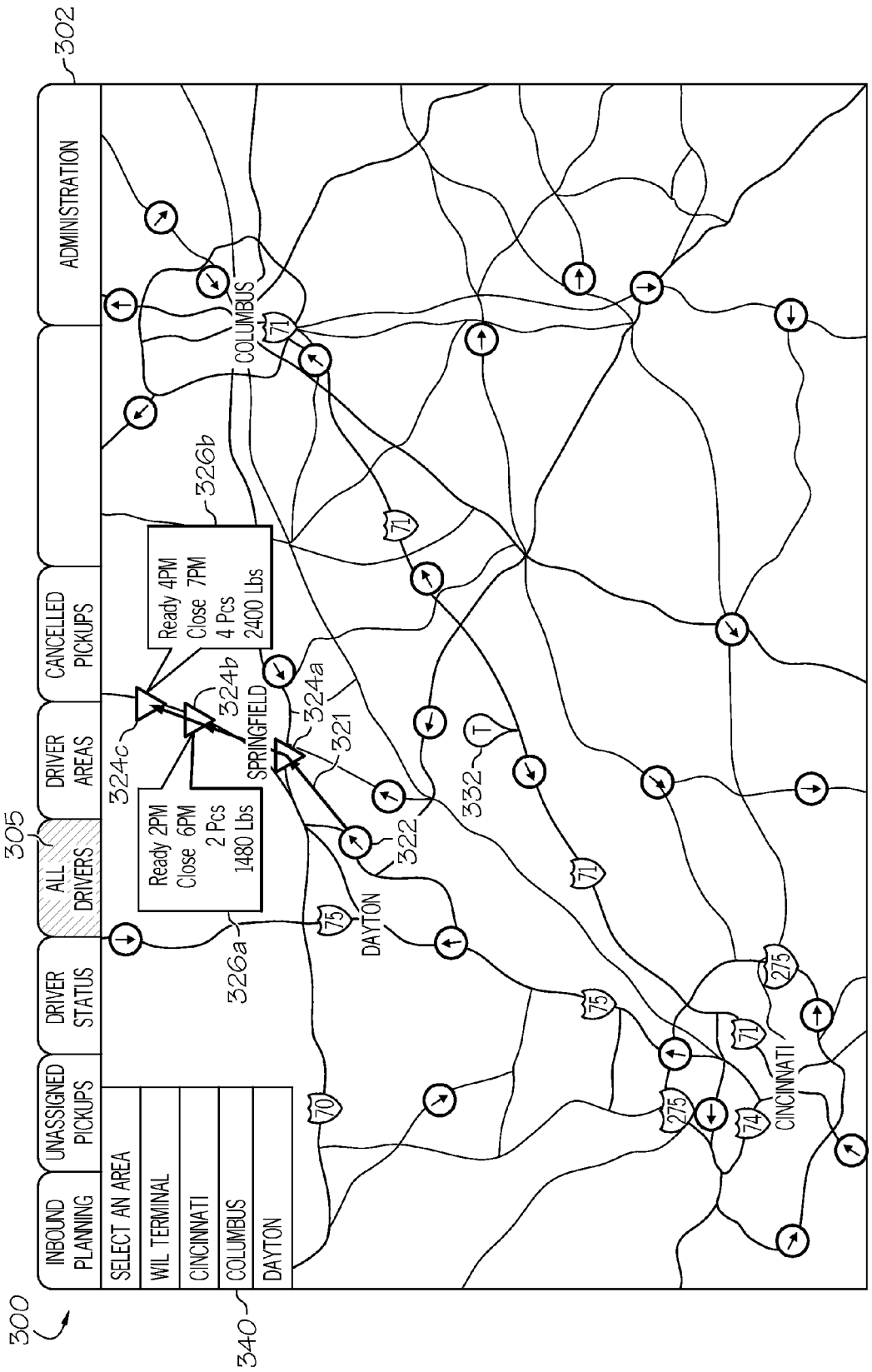

FIG. 8 illustrates a map view 320 having a pickup request icon 330 and closest drivers icons 322a-i indicating drivers that could service the request. The driver icons 322 indicate a direction of the driver's travel. Stops/assignments that have been dispatched to the driver may be shown as a stop icon having a first color (e.g., icons 324a and 324b). Any stops that are assigned to the driver but not yet dispatched may be shown as a stop icon having a second color (e.g., icon 324c). Stop icons may also be color or format coded to indicate stops that have not been assigned. The direction of travel may also be displayed as red directional line segments (e.g., line segment and arrow 321). Hover messages 326a and 326b may also be provided when the dispatcher moves a mouse pointer over a stop/assignment. The hover messages 326a and 326b may display additional information regarding the details of the particular stop/assignment. The displayed information may allow the dispatcher to quickly assess the impact of adding an additional assignment/stop to the driver's current route. FIGS. 9 and 10 illustrate a terminal view map 340 that enables the dispatcher to easily view all of the drivers 322 associated with a specific terminal 332 or within a specific dispatch area.

In one embodiment, the intelligent wireless dispatch system 10 further includes a voice over internet protocol (VoIP) functionality that enables a dispatcher to verbally communicate with a driver or drivers of the fleet. The VoIP function of the intelligent wireless dispatch system may enable communication in a firewall-protected environment via a public cellular network. Embodiments of the present disclosure may employ VoIP in conjunction with cellular communication in a manner that provides firewall security and also prevents unauthorized calls from being received at the Dispatch terminal or the fleet vehicle.

Generally, embodiments incorporating a VoIP communication system may provide two-way radio functionality similar to that currently utilized by the trucking industry via a back office server in conjunction with a Session Initiation Protocol server (SIP). The back office server may be any server type, such as a standard Windows 2003 server, or a Linux server, for example. As described in more detail below, the back office server is configured to set a firewall separating the deployed MDTs and external computing devices from the dispatch computer and other computing devices positioned on the secure side of the firewall. The back office server sets the firewall to enable 2-way communication when the dispatcher initiates a VoIP communication session with one or more MDTs. The SIP server may also be configured as any server type (e.g., Windows 2003 server or a Linux server). The SIP server may be configured to maintain up-to-date network information for each of the deployed MDTs in the fleet. The network information may include, but is not limited to, the current IP address, port number and identification number associated with each MDT. The network information stored within the SIP is used to route VoIP communication sessions to the appropriate MDT or MDTs. The back office server and the SIP server may be two physical servers or two virtual servers running on a single physical server. One skilled in the art will recognize that server means any virtual or physical server.

Through the use of VoIP, a dispatcher is able communicate with the drivers of an entire fleet of trucks, a sub-set group of the entire fleet, or an individual driver within the fleet. Under current radio-based communication systems, a trucking company typically must lease expensive radio tower rights to provide broadcast capabilities that enable a dispatcher and the drivers of a fleet to communicate with one another. Additionally, broadcast messages are usually provided to all truckers on a particular channel, with limited means of targeting a specific sub-group of drivers. Using VoIP, the communication system of the present invention eliminates the need for radio tower leases and provides enhanced communication capabilities between a dispatcher and the drivers of the fleet. The VoIP communication system may also be used by a driver to communicate with personnel other than the dispatcher, such as a third party entity. For example, the system may be configured to enable the driver to contact a customer service agent or other personnel.

More specifically, the VoIP communication system functions as a two-way radio that may be used by a terminal-based dispatcher to communicate with drivers of a trucking fleet. This implementation overcomes a number of barriers in order to provide cost-effective communication capabilities, while functioning properly within a cellular data network (e.g., the SPRINT 3G EVDO network). VoIP typically employs a wired or 802.11 Wireless Local Area Network (WLAN) commonly found in homes and businesses.

Figure 11:
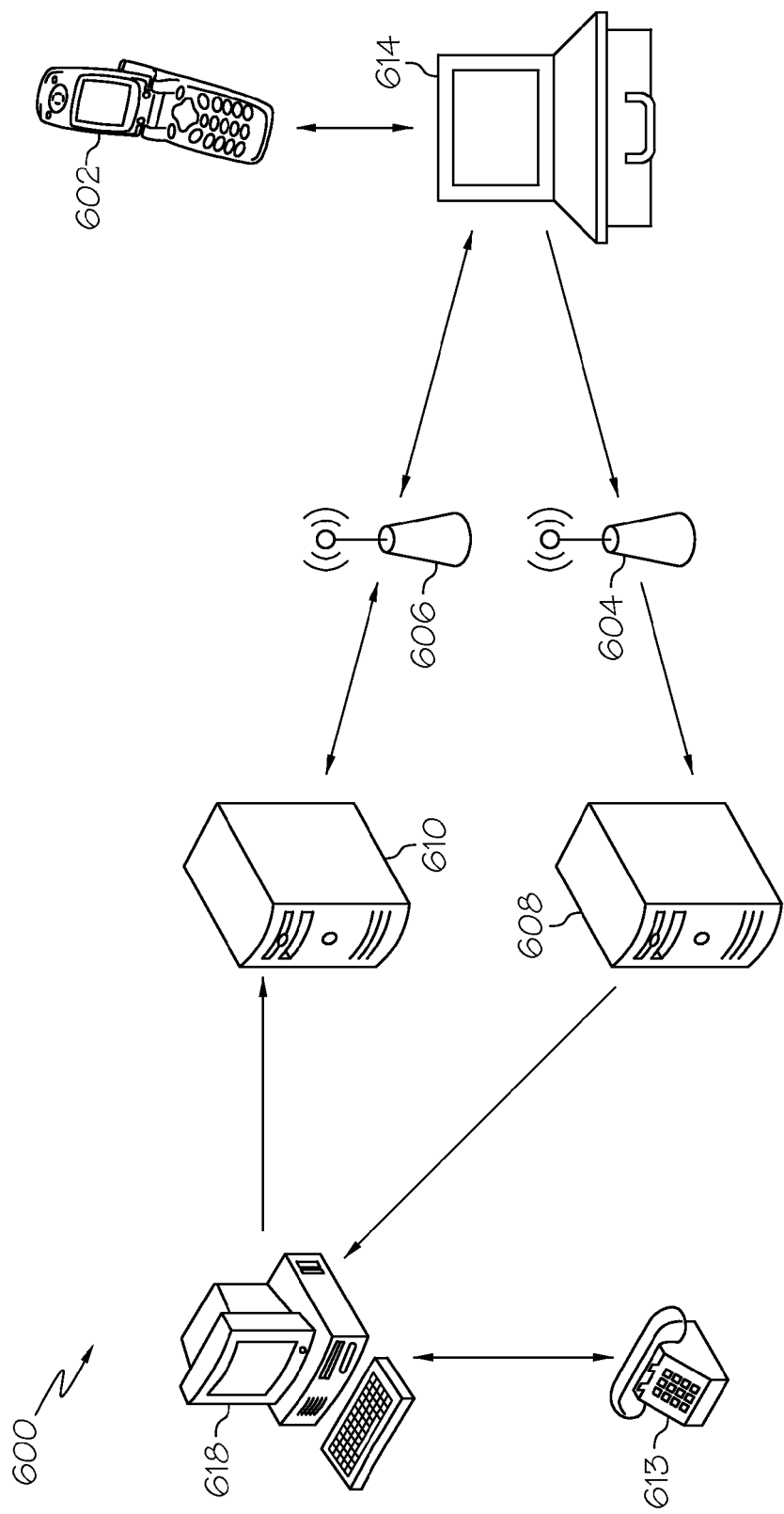
FIG. 11 depicts a schematic illustration of a voice over IP communication system of an exemplary intelligent wireless dispatch system according to one or more embodiments described and illustrated herein.

Referring now to FIG. 11, a schematic of an exemplary intelligent wireless dispatch system 600 having a VoIP communication system is illustrated. First, a driver is equipped with an MDT 614 that is coupled to a communication interface 602, such as a headset (e.g., a Bluetooth headset having a microphone and ear piece speaker), a microphone and speaker, a cellular or similar telephone device, or a CB-style radio unit currently used by the trucking industry, for example. The dispatcher operates a dispatch computer 618 that is coupled to a first server 610 (e.g., an SIP server) and a second server 608 (e.g., a back office server). The dispatcher may similarly operate a communication interface 613 that is coupled to the dispatch computer 618. The MDT 614 and dispatch computer may be in communication via a cellular communications network as indicated by communications icons 606 and 604.

The driver may use the user interface of the MDT 614 to send a call request to the dispatcher over the cellular communications network as indicated by communication icon 604. For example, the driver may press a call dispatch button (not shown) on the touch screen of the MDT 614 to send the call request. Using a public cellular network, the call request is transmitted to the back office server 608 as a data packet or packets. The back office server 608 then routes the incoming call request to the dispatch computer 618, which resides on a secured side of a firewall (not shown). Referring to both FIGS. 11 and 12, after receiving the call request, the dispatch computer 618 adds the driver's call request to a queue of call requests 620 that are visible to the dispatcher on the display of the dispatch computer 618. The dispatcher may then select which call request to respond to from the call requests listed in the call request queue 618 to start a VoIP communications session. The dispatcher initiates a call with a driver by selecting the appropriate call request (e.g., call request 622). The back office server 608 then instructs the firewall to open a pinhole which allows two-way cellular communication between the dispatcher and the requesting MDT over the cellular network as indicated by communication icon 604. The back office server only opens the pinhole when the dispatcher initiates the call. In this embodiment, the firewall prevents inbound cellular communication unless the dispatcher initiates a call.

Figure 12:
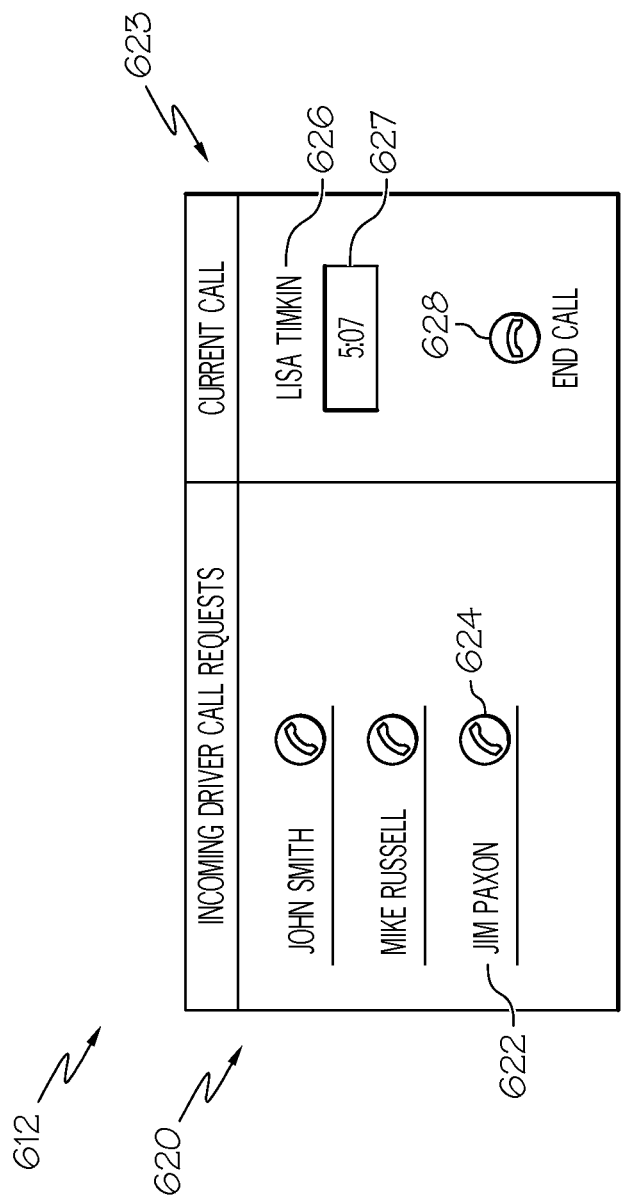
FIG. 12 depicts an exemplary voice over IP interface of an intelligent wireless dispatch system according to one or more embodiments described and illustrated herein.

FIG. 12 illustrates an exemplary VoIP interface 612 that a dispatcher may utilize in managing and initiating VoIP communication sessions. It should be understood that the VoIP interface 612 illustrated in FIG. 12 is for exemplary purposes only and that other configurations are also possible. When a call request is received by the dispatch computer, the driver's name 622 is added to the bottom of the call request queue 620 such that the queue is sorted by oldest to newest call request. In other embodiment, the call requests may be sorted by other criteria. Other information may also be displayed such as the time of the call and other pertinent information related to the call. An initiate call button 624 may also be located next to the driver's name wherein a VoIP communications session is initiated with the associated driver when the dispatcher clicks the initiate call button 624.

The VoIP interface 612 may also include a current call field 623 that provides information regarding the current VoIP communications session such as the driver's name 626 and the length of the current call 627. Other information may also be provided in the VoIP interface 612, such as the auxiliary information described below. The dispatcher may end the call by clicking or otherwise selecting the end call button 628.

The intelligent wireless dispatch system may be programmed such that the dispatcher may contact one or more drivers. For example, the dispatcher may create groups and sub-groups of drivers of which the dispatcher would like to communicate. Initiating a call to one of the groups or sub-groups of drivers enables the dispatcher and the drivers within the group or sub-group to communicate with one another. The groups or sub-groups may be predefined or dynamically created when a dispatcher has a need to communicate with particular drivers.

As another example, in the event that a driver is unable to locate a customer facility or contact personnel at a customer facility, the driver may select the customer assignment/stop on the route displayed on the MDT and initiate a call to the customer contact.

A dispatcher may use the VoIP communications functionality of the intelligent wireless dispatch system when a dispatch exception is presented. This enables a dispatcher to take immediate action by calling the driver when an exception is encountered. The intelligent wireless dispatch system is also configured such that the dispatcher may leave a detailed message for the driver. The MDT will then display a message notification to the driver so that he or she is aware of the message. In some embodiments, drivers may also be able to leave messages for the dispatcher.

Auxiliary data may also be transmitted along with the VoIP communications session to provide efficient workflow by reducing the length and duration of the VoIP call. Context sensitive functionality enables a user to initiate a call with the system by capturing relevant auxiliary data and transmitting such data along with the call. The auxiliary data provides the party being called with the necessary information to understand the situation and take action more quickly. The context sensitive functionality minimizes the effort involved with initiating a call.

In one example, the auxiliary data may include customer service information such as customer data, delivery data, dispatch data, and driver location data. For example, integrated VoIP and auxiliary data communications may be leveraged to streamline the business process that a driver follows when a delivery exception occurs. As an example, after scanning a delivery receipt, the driver may select the customer assignment/stop on the route displayed on the MDT, select the delivery exception, enter information about the exception (e.g., over or under the number of handling units, number of damaged handling units) and initiates a call to the shipper's customer service. The information entered by the driver is transmitted as auxiliary data along with the VoIP communication session and appears on the graphical display operated by the customer service representative. The key information provided by the auxiliary data minimizes the call duration.

Auxiliary data may also be used to diagnose equipment malfunction. For example, if a driver encounters an equipment malfunction, he or she may initiate a call to the maintenance department and the intelligent wireless dispatch system may transmit vehicle condition data gathered from the engine control module or other vehicle sub-systems along with equipment identification numbers, vehicle location, etc. The vehicle condition data may provide maintenance personnel maximum visibility to aid them in resolving the issue remotely. Further, in the event that a mechanic needs to be dispatched or the equipment towed, maintenance personnel will already be notified as to the location of the driver so that the closest personnel may be dispatched.

As can be understood the functionalities of the systems, methods, models, and algorithms described herein can be implemented using software, firmware, and/or associated hardware circuitry for carrying out the desired task. For instance, the various functionalities described can be programmed as a series of instructions, code, or commands using general purpose or special purpose programming languages, and can be executed on one or more general purpose or special purpose computers, controllers, processors or other control circuitry.

The foregoing description of the embodiments has been presented for purposes of illustration and description. It is not intended to be exhaustive nor to limit the invention to the precise form disclosed. Many alternatives, modifications, and variations will be apparent to those skilled in the art in light of the above teaching. Accordingly, it is intended to embrace all alternatives, modifications, and variations that fall within the spirit and broad scope the amended claims.

What is claimed is:

1. An intelligent wireless dispatch system comprising:
   a dispatch computer comprising a processor and a non-transitory computer readable medium tangibly embodying a set of executable instructions; and
   one or more mobile data terminals configured to be positioned on a vehicle and in wireless communication with the dispatch computer, wherein:
   the dispatch computer is configured to be coupled to a graphical display;
   the set of executable instructions is configured cause the processor to:
      display a plurality of drivers arranged in a driver stack on the graphical display, each driver of the plurality of drivers is associated with a vehicle;
      receive exception information from each mobile data terminal;
      display a driver icon corresponding to each driver in the driver stack, wherein each driver icon comprises a format operable to indicate a driver status based at least in part on the exception information;
      sort and display the drivers in the driver stack by the exception information;
      display a driver assignment list for each driver comprising one or more assignments; and
      wirelessly transmit an assignment message to one or more mobile data terminals according to an update to a selected driver assignment list; and
   the mobile data terminals are configured to display the assignment message for acceptance or rejection of an assignment corresponding to the assignment message.

2. The intelligent wireless dispatch system as claimed in claim 1, wherein the exception information comprises an exception type further comprising one or more of the following: a dispatch exception, a stop exception, a global positioning exception and a login exception.

3. The intelligent wireless dispatch system as claimed in claim 2, wherein the exception information further comprises an exception time.

4. The intelligent wireless dispatch system as claimed in claim 2, wherein the set of executable instructions is configured to generate a dispatch exception upon one or more of the following: receiving a message transmission error between the dispatch computer and one or more mobile data terminals, receiving a driver declined assignment message, and not receiving a driver acknowledgment message within a driver response period.

5. The intelligent wireless dispatch system as claimed in claim 2, wherein the set of executable instructions is configured to generate a stop exception upon one or more of the following: a vehicle has a stopped status longer than a stopped time limit and a vehicle has made an unscheduled stop.

6. The intelligent wireless dispatch system as claimed in claim 2, wherein the set of executable instructions is configured to generate a global positioning exception when the dispatch computer has not received global positioning data from a corresponding mobile data terminal within a global positioning data period.

7. The intelligent wireless dispatch system as claimed in claim 2, wherein the set of executable instructions is configured to generate a login exception.

8. The intelligent wireless dispatch system as claimed in claim 2 wherein the set of executable instructions is configured to:
   receive an employee identification number from a mobile data terminal;
   compare a mobile data terminal vehicle number to a dispatched vehicle number; and
   generate a pending login request if the mobile data terminal vehicle number does not equal the dispatched vehicle number.

9. The intelligent wireless dispatch system as claimed in claim 8 wherein the set of executable instructions is configured to receive a login validation instruction in response to the pending login request and log in a user associated with the employee identification number.

10. The intelligent wireless dispatch system as claimed in claim 2, wherein a driver icon having a first format indicates a first driver status and a driver icon having a second format indicates a second driver status.

11. The intelligent wireless dispatch system as claimed in claim 10, wherein:
   the first driver status corresponds with a driver that does not have a dispatch exception and is moving or has been stopped less than a stopped time limit; and
   the second driver status corresponds with a driver that has a dispatch exception.

12. The intelligent wireless dispatch system as claimed in claim 10, wherein a driver icon having a third format indicates a third driver status.

13. The intelligent wireless dispatch system as claimed in claim 12, wherein:
   the first driver status corresponds with a driver that does not have a dispatch exception and is moving or has been stopped less than a stopped time limit;
   the second driver status corresponds with a driver that has a dispatch exception; and
   the third driver status corresponds with a driver does not have a dispatch exception and has been stopped longer then the stopped time limit or the global position data indicates that the driver is more than a prescribed time from a destination.

14. The intelligent wireless dispatch system as claimed in claim 13, wherein:
the first format comprises a green color;
the second format comprises a red color; and
the third format comprises a yellow color.

15. The intelligent wireless dispatch system as claimed in claim 13, wherein a driver format having an additional format indicates an additional driver status.

16. The intelligent wireless dispatch system as claimed in claim 13, wherein:
drivers having a driver icon of the second format are listed at a top of the driver stack;
drivers having a driver icon of the third format are listed below the driver icon that are of a first format; and
drivers having a driver icon of the first format are listed below the driver icons that are of a the second format.

17. The intelligent wireless dispatch system as claimed in claim 16, wherein drivers having a driver icon of the second format are further sorted by oldest exception to newest exception within the driver stack, and drivers having a driver icon of the third format are further sorted by oldest exception to newest exception within the driver stack.

18. The intelligent wireless dispatch system as claimed in claim 1, wherein the set of executable instructions is further configured to cause the processor to display on the graphical display a hover message proximate a selected driver icon upon a mouse pointer being positioned over the selected driver icon.

19. The intelligent wireless dispatch system as claimed in claim 18, wherein the hover message comprises an exception summary corresponding to a driver associated with the selected driver icon.

20. The intelligent wireless dispatch system as claimed in claim 1, wherein the driver assignment list for each driver is configured such that assignments may be reordered in the driver assignment list, new assignments may be added to the driver assignment list, and existing assignments may be removed from the driver assignment list.

21. The intelligent wireless dispatch system as claimed in claim 1, wherein a modification to the driver assignment list displayed on the graphical display of the dispatch computer automatically modifies a driver assignment displayed on one or more mobile data terminals associated with one or more drivers.

22. The intelligent wireless dispatch system as claimed in claim 1, wherein:
the driver assignment list for each driver is configured such that a previously assigned assignment for a first driver is reassigned to a second driver by moving the previously assigned assignment from the driver assignment list associated with the first driver to the driver assignment list associated with the second driver; and
the set of executable instructions is further configured to cause the processor to wirelessly update the driver assignment lists associated with the first and second drivers.

23. The intelligent wireless dispatch system as claimed in claim 1, wherein:
the set of executable instructions is further configured to cause the processor to display a transmission status icon in the driver stack corresponding with a driver to which an assignment message has been transmitted; and
the transmission status icon provides a transmission report comprising a list of one or more transmission status and user action status messages that have been selected in accordance one or more filter rules.

24. The intelligent wireless dispatch system as claimed in claim 1, wherein the set of executable instructions is configured such that the dispatch computer and the one or more mobile data terminals are operable to exchange predefined text messages over the wireless communication network.

25. The intelligent wireless dispatch system as claimed in claim 1, wherein the set of executable instructions is further configured to cause the processor to display one or more road maps on the graphical display.

26. The intelligent wireless dispatch system as claimed in claim 25, wherein the one or more road maps comprises a terminal view map configured to display real time vehicle position information, travel information and assignment information for vehicles within a terminal geographic region.

27. The intelligent wireless dispatch system as claimed in claim 25, wherein the one or more road maps comprises a street map view, an aerial view or a combination thereof.

28. The intelligent wireless dispatch system as claimed in claim 25, wherein:
the one or more road maps comprises a driver map corresponding to a selected driver;
the driver map comprises vehicle position information, travel information and assignment information corresponding to the vehicle of the selected driver.

29. The intelligent wireless dispatch system as claimed in claim 25, wherein the assignment information comprises formatted stop icons operable to indicate whether a stop was scheduled or unscheduled.

30. The intelligent wireless dispatch system as claimed in claim 1, wherein the set of executable instructions is further configured to cause the processor to display on the graphical display an unassigned pickups interface comprising:
a customer pickup request list comprising one or more unassigned pickup requests, each unassigned pickup request having a pickup request information associated therewith; and
a driver schedule list comprising one or more driver schedules associated with a driver, each driver schedule having driver assignment information associated therewith.

31. The intelligent wireless dispatch system as claimed in claim 30, wherein:
the pickup request information comprises one or more of the following: customer location, request ready time, customer close time, estimated number of handling units, and total weight; and
the driver assignment information comprises the driver assignment list and trailer capacity of a trailer associated with the driver.

32. The intelligent wireless dispatch system as claimed in claim 30, wherein:
the unassigned pickups interface further comprises a mapping icon associated with each unassigned pickup request;
the set of executable instructions is configured to cause the processor to display on the graphical display an unassigned pickup request map upon a selection of a selected mapping icon;
the unassigned pickup request map displays a location of an unassigned pickup request and location information, travel information and assignment information for one or more drivers.

33. The intelligent wireless dispatch system as claimed in claim 30, wherein the unassigned pickups interface is configured such that a selected unassigned pickup request is assigned to a selected driver by moving the selected unassigned pickup request from the customer pickup request list to a desired position within a selected assignment list of the selected driver.

34. An intelligent wireless dispatch system comprising:
a dispatch computer;
a first server coupled to the dispatch computer;
a second server coupled to the dispatch computer; and
one or more mobile data terminals, wherein each mobile data terminal is configured to be positioned on a vehicle and is communicably coupled to the first and second servers over a wireless communication network;
wherein:
the dispatch computer and the one or more mobile data terminals are configured to be in two-way voice communication via a voice over IP protocol over the wireless communication network such that:
a dispatcher operating the dispatch computer may initiate a voice over IP communication session with one or more mobile data terminals routed through the first server and over the wireless communication network; and
a driver operating an individual mobile data terminal may send a call request to the dispatcher that is transmitted over the wireless communication network and routed through the second server, wherein the call request is added to a call request queue on the dispatch computer; and
the dispatch computer and the one or more mobile data terminals are operable to exchange predefined text messages over the wireless communication network and routed through the second server.

35. The intelligent wireless dispatch system as claimed in claim 34, wherein a selection of a call request by the dispatcher initiates a voice over IP communication session between the dispatch computer and a selected mobile data terminal associated with the selected call request that is routed through the first server and over the wireless communication network.

36. The intelligent wireless dispatch system as claimed in claim 34, wherein the first server is programmed to maintain network information for each mobile data terminal.

37. The intelligent wireless dispatch system as claimed in claim 36, wherein the network information for each mobile data terminal comprises a current IP address, a current port number and an identification number.

38. The intelligent wireless dispatch system as claimed in claim 34, wherein:
the intelligent wireless dispatch system further comprises a firewall configured to prevent inbound communication over the wireless communication network and selectively enable communication between the dispatch computer and the wireless communication network; and
the second server is programmed to:
receive the call request;
transmit the call request to the dispatch computer; and
open the firewall to enable the voice over IP communication session between the dispatch computer and the selected mobile data terminal upon a selection of the call request by the dispatcher.

39. The intelligent wireless dispatch system as claimed in claim 34, wherein the first server and the second server comprise virtual servers provided within a single physical server.

40. The intelligent wireless dispatch system as claimed in claim 34, wherein the dispatch computer and the one or more mobile data terminals are further configured to transmit auxiliary data to one another along with the voice over IP communication session.

41. The intelligent wireless dispatch system as claimed in claim 40, wherein the auxiliary data comprises customer data, delivery data, dispatch data, vehicle condition data, or combinations thereof.

42. The intelligent wireless dispatch system as claimed in claim 34, wherein the dispatch computer is further configured to transfer the voice over IP communication session to a third party entity.

43. An intelligent wireless dispatch system comprising:
a dispatch computer; and
one or more mobile data terminals configured to be positioned on a vehicle and in wireless communication with the dispatch computer;
wherein:
the dispatch computer is configured to be coupled to a graphical display;
the dispatch computer is programmed to:
display on the graphical display a plurality of drivers arranged in a driver stack by an exception type and an exception time, each driver of the plurality of drivers is associated with a vehicle;
receive exception information from each mobile data terminal; and
update an arrangement of the plurality of drivers in the driver stack in accordance with the exception information; and
the dispatch computer and the one or more mobile data terminals are configured to be in two-way voice communication via a voice over IP protocol over the wireless communication network such that:
a dispatcher operating the dispatch computer may initiate a voice over IP communication session over the wireless communication network; and
a driver operating an individual mobile data terminal may send a call request to the dispatcher that is transmitted over the wireless communication network and routed through the second server, wherein the call request is added to a call request queue.

44. The intelligent wireless dispatch system as claimed in claim 43, wherein the intelligent wireless dispatch system further comprises a firewall configured to prevent inbound communication over the wireless communication network and selectively enable communication between the dispatch computer and the wireless communication network.

45. The intelligent wireless dispatch system as claimed in claim 43, wherein the dispatch computer and the one or more mobile data terminals are further configured to transmit auxiliary data to one another along with the voice over IP communication session.

46. The intelligent wireless dispatch system as claimed in claim 45, wherein the auxiliary data comprises customer data, delivery data, dispatch data, vehicle condition data, or combinations thereof.

47. The intelligent wireless dispatch system as claimed in claim 43, wherein the dispatch computer is further programmed to transfer the voice over IP communication session to a third party entity.

48. The intelligent wireless dispatch system as claimed in claim 43, wherein the dispatch computer is further programmed to:
display a driver icon corresponding to each driver in the driver stack, wherein each driver icon comprises a format operable to indicate a driver status based at least in part on the exception information; and sort and display the drivers in the driver stack by the exception information such that drivers having a dispatch exception are at the top of the driver stack.

49. The intelligent wireless dispatch system as claimed in claim 48, wherein a driver icon having a first format indicates a first driver status and a driver icon having a second format indicates a second driver status.

50. The intelligent wireless dispatch system as claimed in claim 49, wherein:
the first driver status corresponds with a driver that does not have a dispatch exception and is moving or has been stopped less than a stopped time limit; and
the second driver status corresponds with a driver that has a dispatch exception.

51. The intelligent wireless dispatch system as claimed in claim 49, wherein a driver icon having a third format indicates a third driver status.

52. The intelligent wireless dispatch system as claimed in claim 51, wherein:
the first driver status corresponds with a driver that does not have a dispatch exception and is moving or has been stopped less than a stopped time limit;
the second driver status corresponds with a driver that has a dispatch exception; and
the third driver status corresponds with a driver does not have a dispatch exception and has been stopped longer then the stopped time limit or the global position data indicates that the driver is more than a prescribed time from a destination.

53. The intelligent wireless dispatch system as claimed in claim 52, wherein:
drivers having a driver icon of the second format are listed at a top of the driver stack;
drivers having a driver icon of the third format are listed below the driver icon that are first color; and
drivers having a driver icon of the first format are listed below the driver icons that are the second color.

54. The intelligent wireless dispatch system as claimed in claim 53, wherein drivers having a driver icon of the second format are further sorted by oldest exception to newest exception within the driver stack, and drivers having a driver icon of the third format are further sorted by oldest exception to newest exception within the driver stack.

* * * * *